United States Patent [19]

Horsch

[11] Patent Number: 4,877,116
[45] Date of Patent: Oct. 31, 1989

[54] HYDRAULIC CONTROL SYSTEM FOR A TRACTOR TRANSMISSION

[75] Inventor: Joachim Horsch, Lombard, Ill.

[73] Assignee: J. I. Case Company, Racine, Wis.

[21] Appl. No.: 213,364

[22] Filed: Jun. 30, 1988

[51] Int. Cl.$^4$ ............................................. B60K 41/22
[52] U.S. Cl. .............................. 192/3.57; 192/87.13; 192/87.18; 192/109 F; 74/745
[58] Field of Search .................. 192/3.57, 3.63, 87.13, 192/87.18, 87.19, 109 F; 74/745

[56] References Cited

U.S. PATENT DOCUMENTS

| | | | |
|---|---|---|---|
| 2,619,848 | 12/1952 | Carnagua | 192/87.13 |
| 3,274,858 | 9/1966 | Meyer et al. | 192/87.13 |
| 3,944,035 | 3/1976 | McRay | 192/3.57 |
| 4,093,051 | 6/1978 | Kreitzberg | 192/87.13 |
| 4,498,356 | 2/1985 | Vater et al. | 74/745 |
| 4,576,063 | 3/1986 | Akashi et al. | 74/745 |
| 4,643,285 | 2/1987 | Horsch | 192/87.13 |
| 4,646,895 | 3/1987 | Horsch | 192/87.13 |
| 4,651,858 | 3/1987 | Horsch | 192/87.13 |
| 4,693,347 | 9/1987 | Nishikawa et al. | 192/3.57 |

Primary Examiner—Leslie A. Braun
Assistant Examiner—Andrea Pitts
Attorney, Agent, or Firm—Dressler, Goldsmith Shore, Sutker & Milnamow

[57] ABSTRACT

A hydraulic control system for a transmission including a speed transmission assembly, a range transmission assembly, and a hydraulically actuated master clutch for selectively coupling the transmission assemblies. The speed transmission assembly includes a plurality of hydraulically actuated clutch assemblies for effecting different forward output speeds and at least one reverse output speed. The range transmission assembly also includes a plurality of hydraulically actuated clutch assemblies. The control system includes a valve body connected to a hydraulic source of fluid pressure. A plurality of control valves are positioned in the valve body by an operator controlled shift lever. The control valves direct fluid pressure to various clutch assemblies in the speed and range transmission assemblies to condition the transmission into a forward, reverse, or neutral mode of operation as a function of shift lever position. The control system further includes hydraulic logic for modulating master clutch operation as a function of various transmission operating conditions.

41 Claims, 18 Drawing Sheets

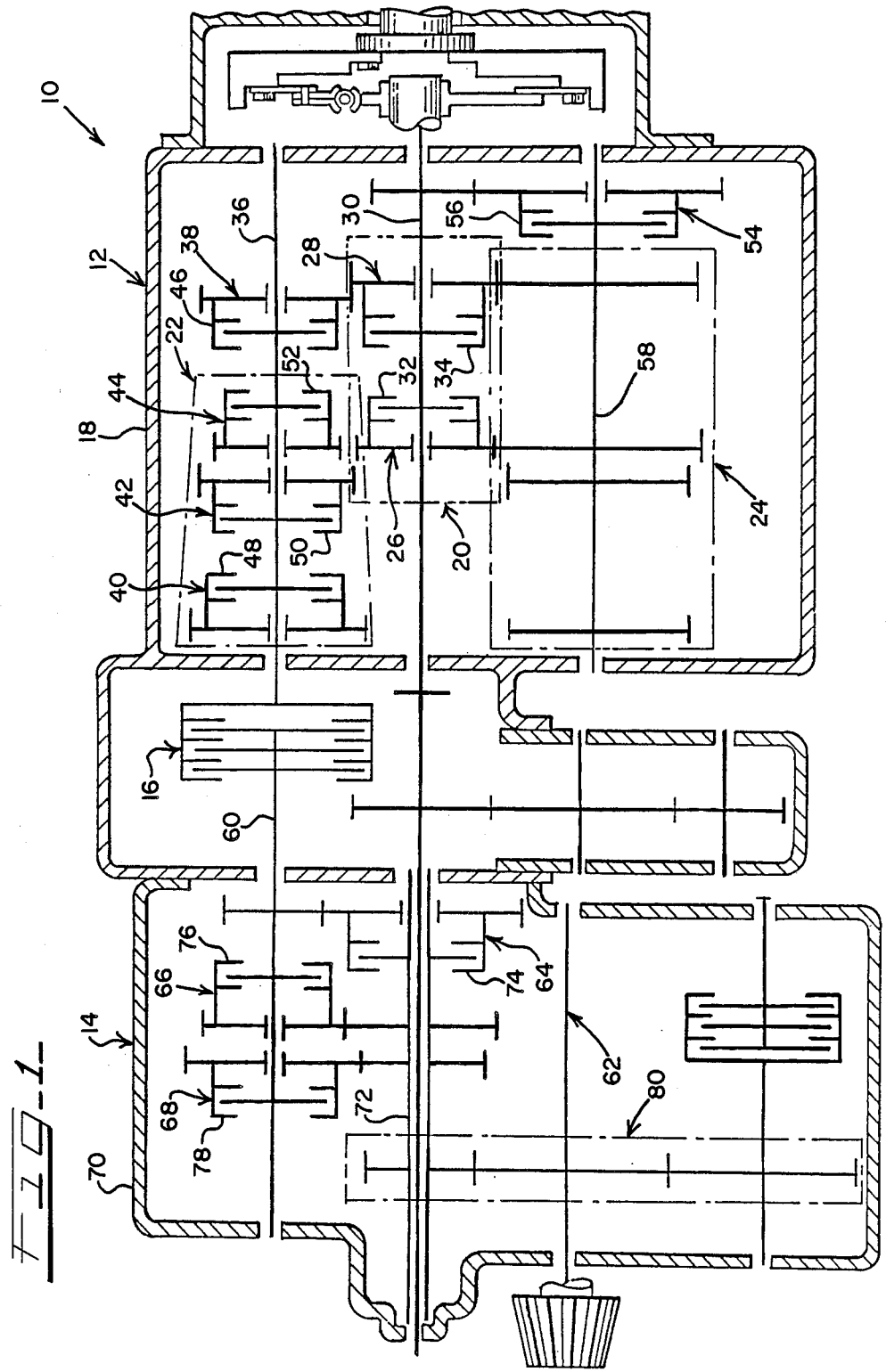

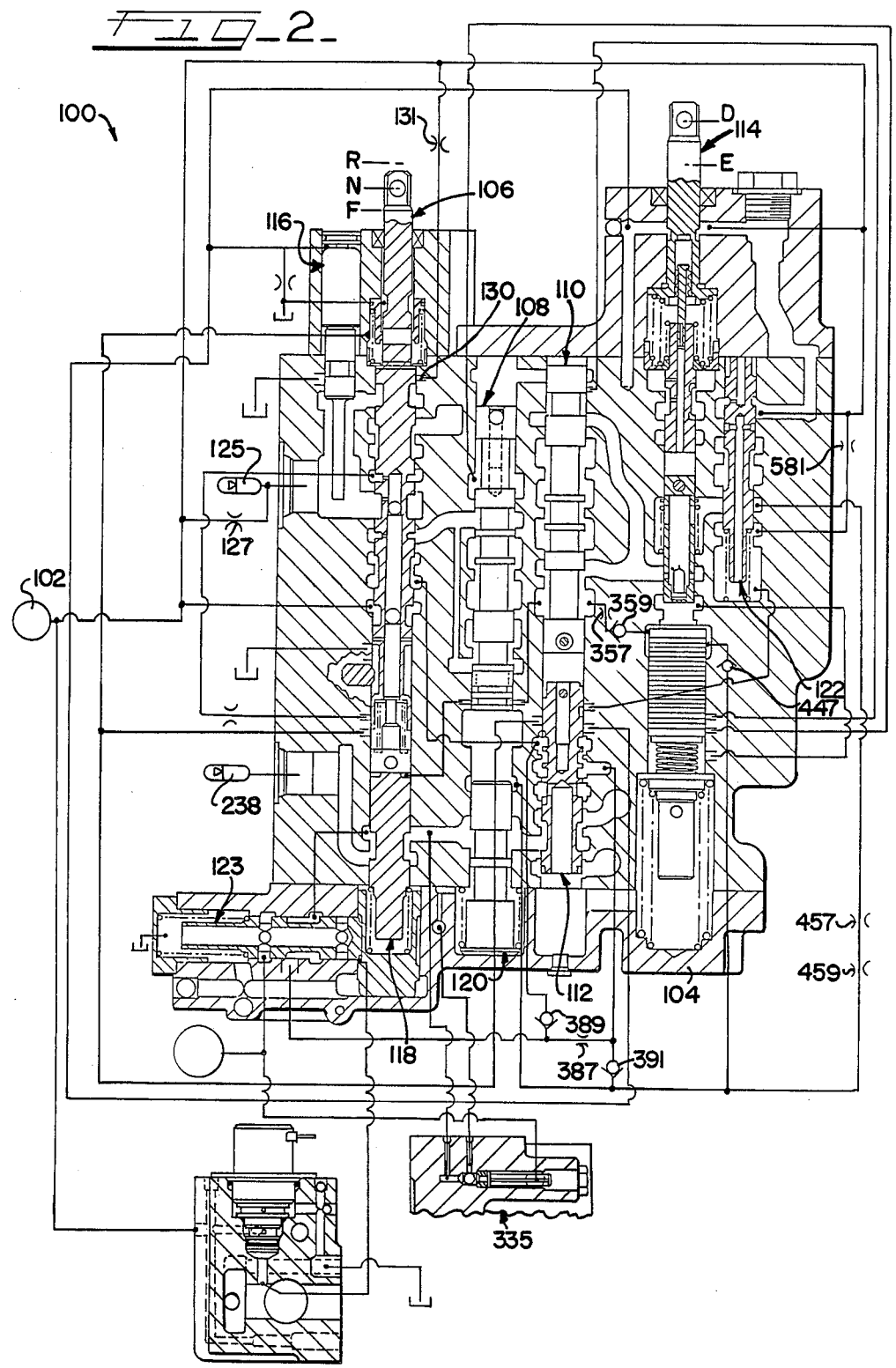
FIG_2

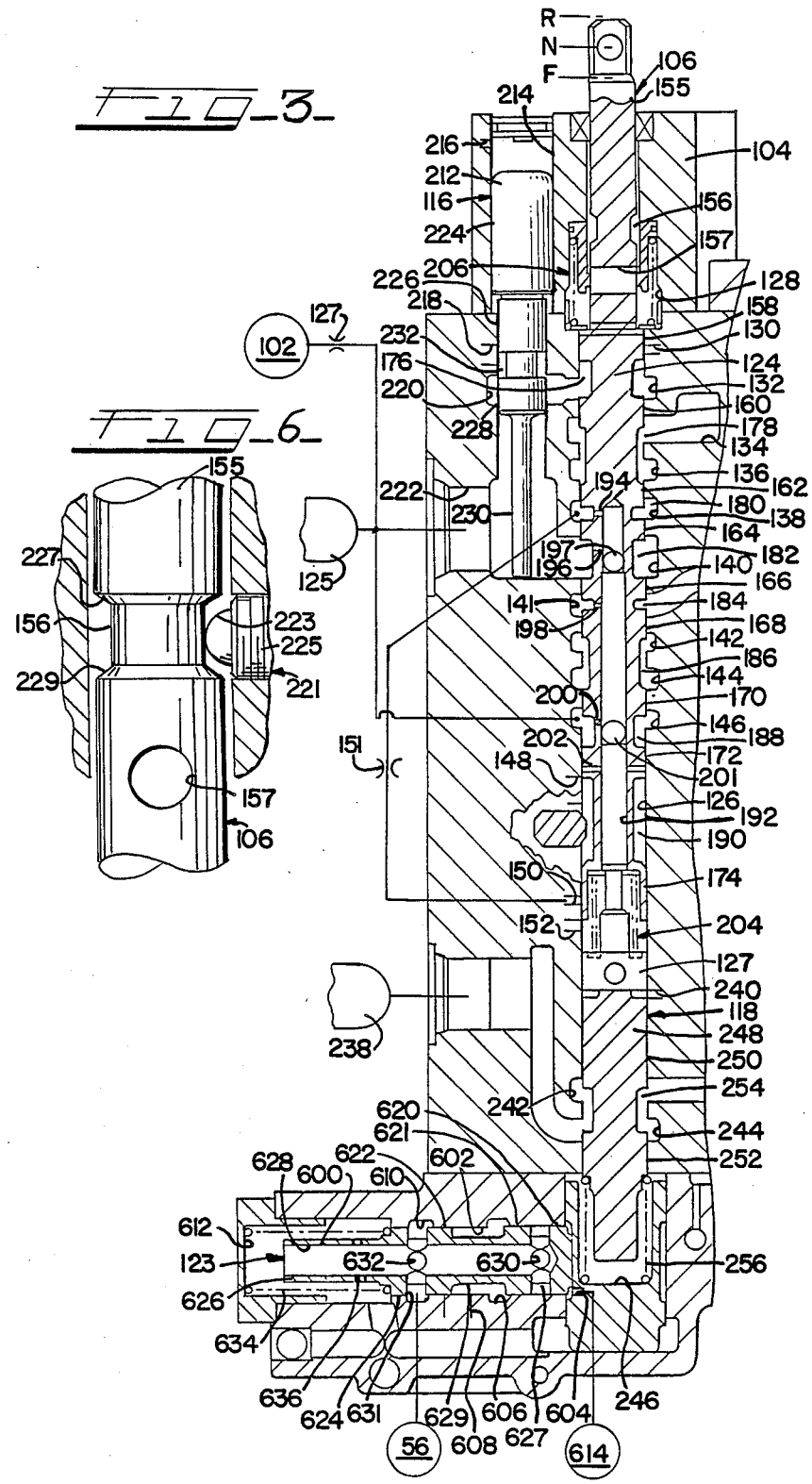

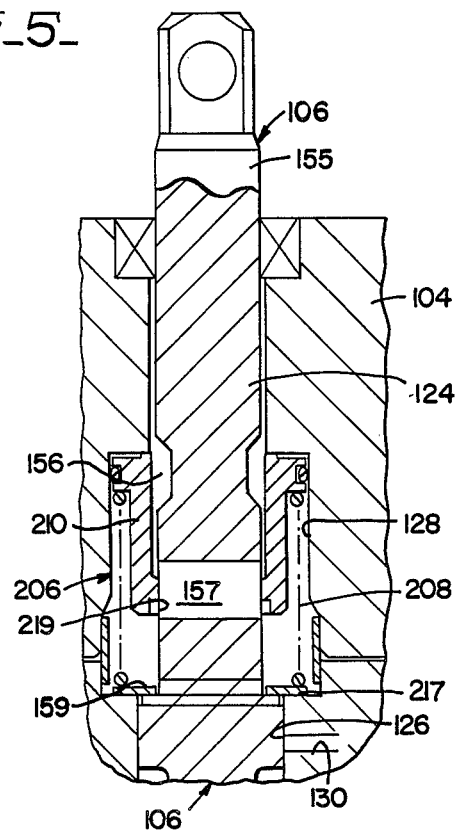
FIG-5-
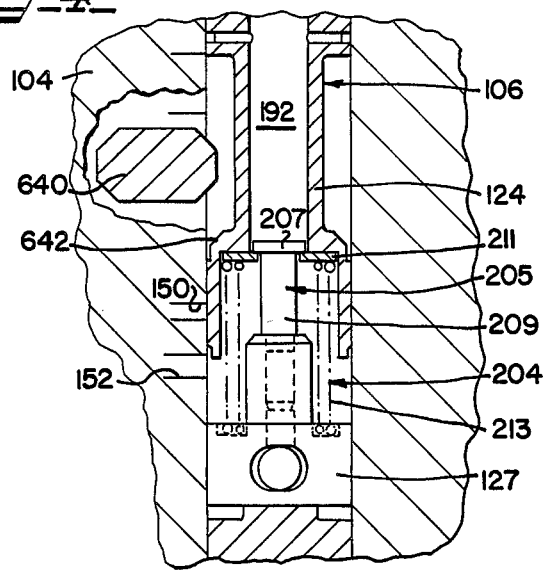
FIG-4-

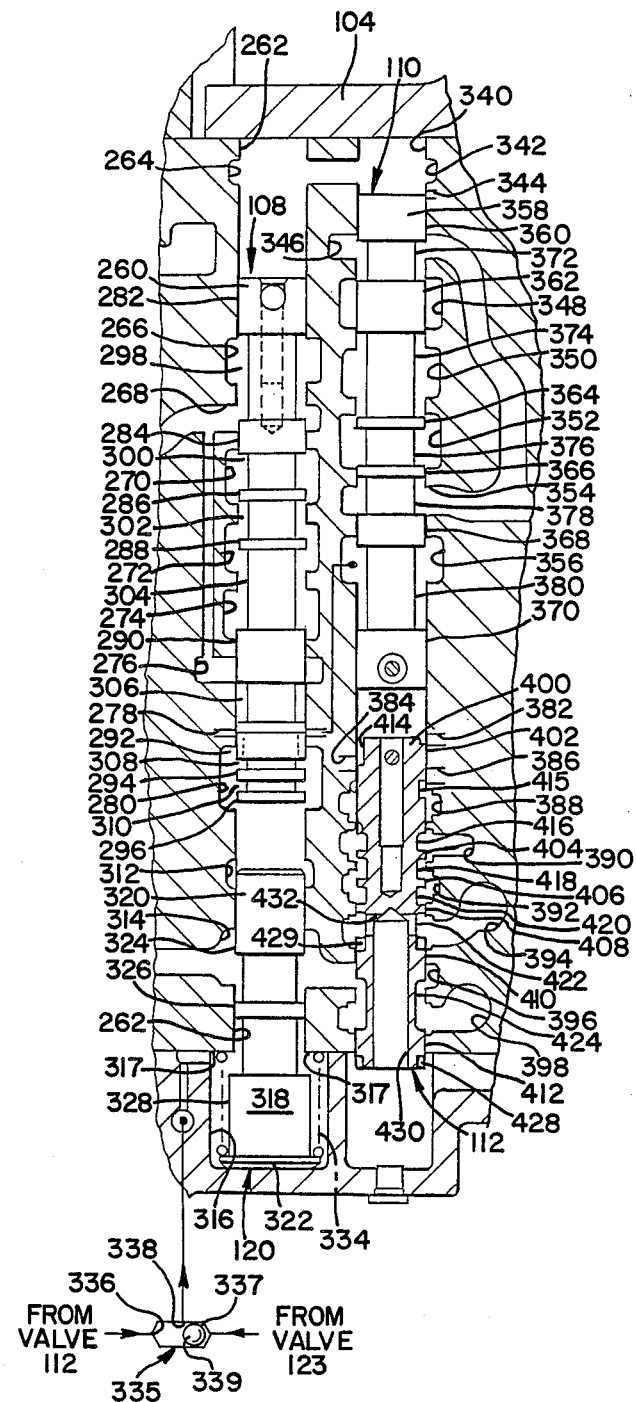

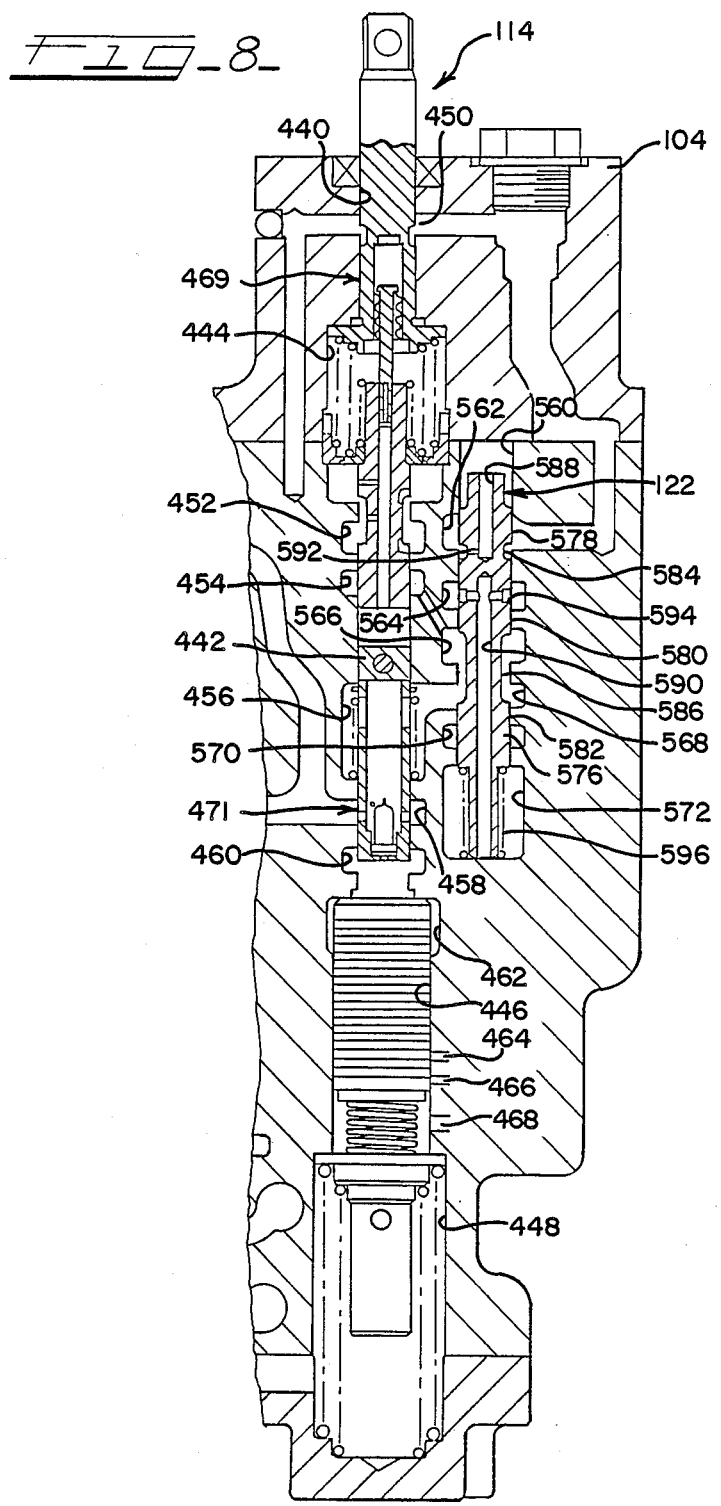
FIG_8_

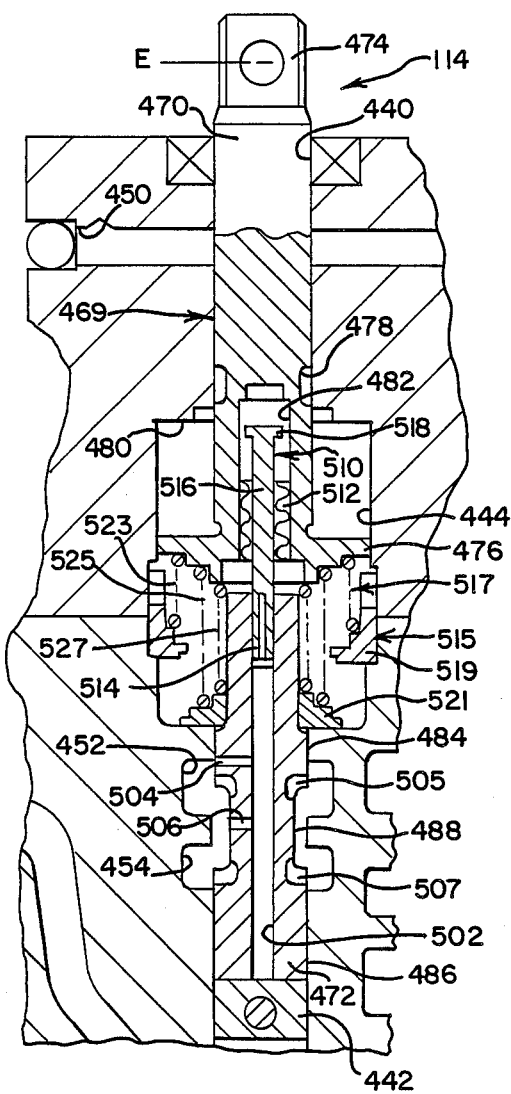
FIG-9-

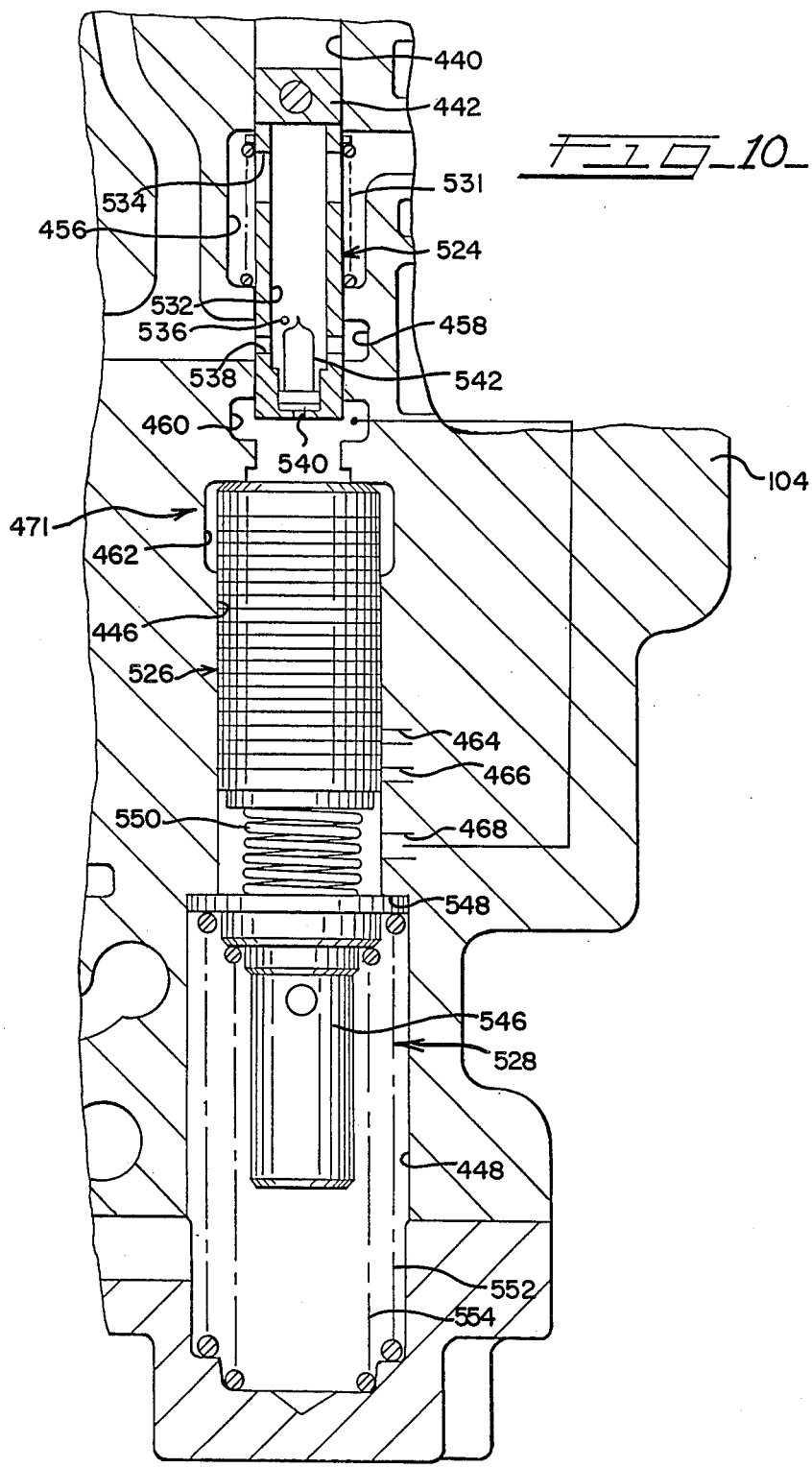
FIG_10

FIG_14

FIG_16

FIG_17

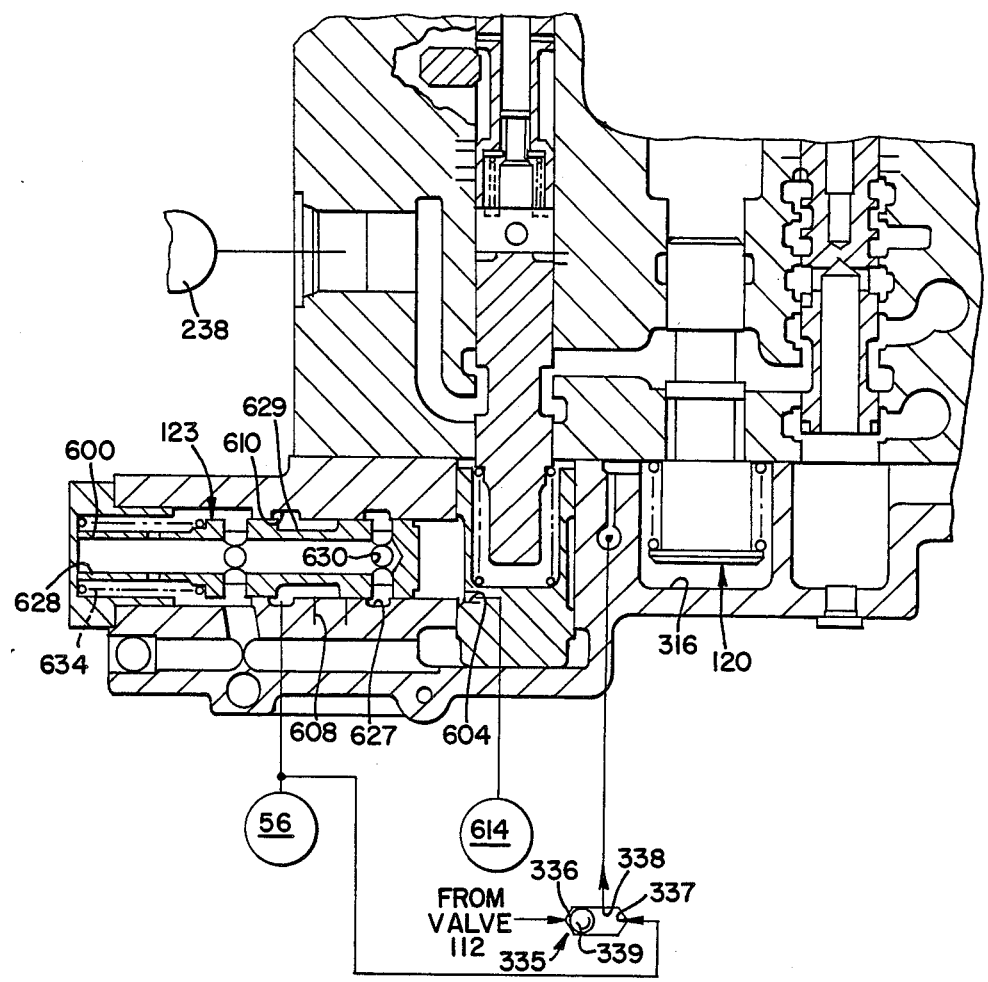
FIG_20

HYDRAULIC CONTROL SYSTEM FOR A TRACTOR TRANSMISSION

FIELD OF THE INVENTION

The present invention relates to a multi-speed powershift transmission having three hydraulically actuated stages connected in series and, more particularly, to a hydraulic control system for operating such stages in a manner effecting smooth, quality shifts between gear ratios.

BACKGROUND OF THE INVENTION

Transmissions normally employed in agricultural and light industrial tractors are designed to develop a plurality of different ground speeds for the tractor. Present day tractors are being designed to provide an increased number of ground speeds so that the tractor is more versatile and, thus, capable of being used in all types of agricultural and other operations.

Some agricultural tractors use a transmission capable of developing 27 forward speed ratios and 9 reverse speed ratios. (As a practical matter, however, only 24 speed ratios and 6 reverse speeds are commonly utilized during operation of the tractor.) To effect such ends, the transmission includes a speed transmission assembly, a range transmission assembly, and a master clutch for selectively joining the speed and range transmission assemblies. Such a transmission further allows the operator to condition the transmission with a single transmission shift lever into various gear ratios as the tractor is "on-the-go".

The speed transmission assembly includes an input stage which is connectable to the output of an engine and an output stage which is connected to the master clutch. The input and output stages are interconnected by a cluster gear assembly. The input stage includes hydraulic clutch operated gear drive assemblies for providing two different input speed ratios. The addition of a creeper gear assembly will provide a third different input speed ratio. The output stage of the speed transmission assembly includes an output shaft, hydraulic clutch operated forward drive gear assemblies and a hydraulic clutch operated reverse gear assembly. The output shaft is connected to the master clutch.

The range transmission assembly includes an input shaft connected to the master clutch, a transmission output shaft, and a plurality of range assemblies operably arranged between the input shaft and the transmission output shaft. Each range assembly develops a different speed ratio and includes a hydraulic clutch operated apparatus. Thus, a total of 27 forward speed ratios and 9 reverse speed ratios are obtainable through such a transmission arrangement.

The various clutch operated assemblies disposed in the speed and transmission assemblies are commonly referred to as powershift clutches. Such clutches include a series of interleaved frictional elements but do not usually have the capability to slip under load or transfer relatively high levels of torque. Accordingly, a hydraulically actuated master clutch is provided between the speed transmission and the range transmission.

The master clutch has the necessary heat capacity to slip under load thus providing for modulated transmission engagement and thereby effecting soft shifts between speed ratios. A soft shift in a transmission will avoid wear and tear on the components of the powershift clutches and also avoids operator discomfort.

It is well known to systematically control a transmission by selectively applying pressurized hydraulic fluid to different portions of the transmission to perform various or different functions. The control system may, for example, control application of different clutch operated apparatus in the speed transmission assembly and one clutch operated range assembly to develop various speed ratios. To effect quality shifts between gear ratios, the control system must be able to bring one clutch operated apparatus "ON" and slip and other clutch operated apparatus "OFF" in a timely and synchronized manner. Since the various clutch apparatuses are operated in specific combination relative to each other, an error in logic by the control system will quickly destroy the frictional elements within the powershift clutches.

In the process of transferring power from a transmission input shaft to the transmission output shaft through clutch operated units, it would be most beneficial if the transmission control system could satisfy each of the following design criteria. First, except in a neutral condition, the control system cannot allow two clutch assemblies to be engaged simultaneously within either the input stage or the output stage of the speed transmission assembly or the range transmission assembly. Second, the control system should provide a positive neutral (no clutch drag can be transmitted to the output shaft of the transmission) such that the transmission is free wheeling in a neutral condition. Next, a preferred form of control system will have a low flow restriction to provide rapid fill clutch actuation with a gradual pressure rise after a clutch fill operation. Moreover, the control system should be compatible with a simple mechanical linkage. Next, a preferable control system will allow a shift from neutral to any gear ratio without imparting shift shock. A desirable control system should permit downshifting from high speed ratios with the master clutch disengaged without imparting unexpected shift shock. Additionally, the control system should be designed to protect the various powershift clutches disposed in the speed and range transmission assemblies from failure if the control system malfunctions or if the operator shifts the transmission in an unusual manner. Furthermore, a preferred form of control system should not allow transfer of power through the transmission if the tractor is started in gear unless the transmission shift lever is first moved to a neutral position. Finally, if the master clutch and the clutch pedal become disconnected from each other, a preferable form of a control system will prevent the transmission from transmitting power therethrough.

SUMMARY OF THE INVENTION

In view of the above, and in accordance with the present invention, there is provided a control system for a transmission which is shiftable from a neutral condition into either forward or reverse conditions as selected by a transmission shift lever. The transmission includes speed and range transmission assemblies which are selectively coupled by a fluid actuated master clutch.

The control system of the present invention includes a valve body which is connected to a source of hydraulic pressure. A plurality of control valves are reciprocally arranged in the valve body to condition the transmission into a forward, reverse, or neutral mode of operation as a function of shift lever position. The control system further includes hydraulic logic for modulating master clutch operation as a function of various transmission operating conditions.

The speed transmission assembly for the transmission comprises interconnected input and output sections. The input section includes an input shaft and alternatively operated, odd/even drive clutch assemblies for developing at least two different input speed ratios. Preferably, a creeper gear arrangement is also provided in the speed transmission assembly for developing a third input speed ratio. The output section is connected to the master clutch and includes at least three clutch operated forward drive gears and a clutch operated reverse drive gear.

The range transmission assembly includes an input shaft, a transmission output shaft and at least three different clutch operated range assemblies. The input shaft is connected to the master clutch. The three clutch operated range assemblies are operably arranged between the input shaft and the transmission output shaft.

According to one aspect of the present invention, the control system comprises a valve body which is connected to a source of pressurized fluid. First operative means, arranged in combination with the valve body, alternatively directs pressurized fluid to one of the odd-/even drive clutch assemblies of the speed transmission assembly input section with every gear ratio change of the transmission. Second operative means, arranged in combination with the valve body, selectively directs pressurized fluid to one of the three clutch operated forward drive gears of the speed transmission assembly. Third operative means, arranged in combination with the valve body, selectively directs pressurized fluid to one of the clutch operated range assemblies of the range transmission assembly. Fourth operative means, arranged in combination with the valve body, modulates operation of the master clutch between engaged and disengaged. Fifth operative means, arranged in combination with the valve body, controls pressurized fluid flow to the first, second and third operative means and to the clutch operated reverse drive gear as a function of the position of the transmission shift lever.

In accordance with a preferred embodiment, the control system further includes means for blocking a directed flow of pressurized fluid to the clutch operated range assemblies whenever the master clutch is disengaged. By such construction, the transfer of power through the transmission is interrupted if the master clutch is disengaged, thus avoiding unexpected shift shocks when downshifting from the higher speed ratios.

Such blocking means includes a valve whose linear position in the valve body controls fluid flow therepast. The linear position of the valve is determined as a function of pressure differentials acting against the valve. Moreover, this valve blocks a directed flow of regulated pressure to the clutch operated range assemblies when the transmission is in a neutral position.

In line with the above noted design criteria, the control system of the present invention also provides a positive neutral condition for the transmission. To effect such ends, the second and fifth operative means operate in combination to direct pressurized fluid to at least two clutch operated drive gears in the output section of the speed transmission to block incidental torque flow through the transmission.

Moreover, the control system of the present invention protects the powershift clutches disposed throughout the transmission. To effect such ends, the first operative means exhausts fluid pressure which is directed thereto if a change in speed ratios is not effected within a predetermined time period. If the change in speed ratios is not effected in a predetermined time period, the first operative means assumes a neutral position thereby preventing the transfer of power through the transmission and thereby, protecting the power shift clutches.

Preferably, the first, second and third operative means are connected for interrelated movement in the valve body. By such construction, if any one of such operative means become stuck, the transmission will be protected against damage by the first operative means assuming a neutral position preventing transfer of power through the transmission.

The control system further provides against tractor movement if the tractor is started with the transmission shift lever in other than a neutral position or the transmission being in other than a neutral condition. If the tractor is started with the transmission shift lever in other than a neutral condition the control system will prevent engagement of the master clutch and thereby, prevent the transfer of torque through the transmission.

In accordance with another aspect of the invention there is provided a control system for a transmission of the above described nature having a fluid pressure actuated master clutch assembly for selectively coupling a speed transmission assembly with a range transmission assembly. The control system includes a valve body having operator controlled means arranged in the valve body. The operator controlled means selectively directs fluid pressure to various clutch operated means in the speed and transmission assemblies to condition the transmission into a forward, reverse, or neutral mode of operation. The control system further includes means for modulating master clutch operation as a function of various transmission operating condition.

In a presently preferred embodiment, the operator control means includes a control valve which is positionally moveable in the valve body between forward, reverse and neutral position. The control valve requires only relatively low actuating forces to be applied thereto to move into it's forward, reverse or neutral position. Once moved into forward or reverse positions, however, the control valve is maintained in either forward or reverse positions under relatively large forces.

Preferably, such operator control means, when in a neutral position, directs pressurized fluid to at least two clutch operated means in the speed transmission assembly to block incidental torque flow through the transmission Moreover, the directed fluid pressure flow to the clutch operated means in the range transmission assembly is reduced when the control valve is positioned in neutral.

As currently embodied, the control valve of the operator control means is a spring centered valve which is normally biased toward a neutral position The position of the control valve is monitored by a switch assembly. The output of the switch assembly controls starting of the tractor.

Such operator control means further includes a valve which is shiftable between two positions and across a neutral position for every gear ratio change. The shiftable valve is fluidically interconnected with the means for modulating master clutch operation.

The means for modulating master clutch operation includes a fluid pressure responsive valve. This fluid pressure responsive valve is fluidically interrelated with the operator control means such that the master clutch operating pressure is automatically modulated in higher forward speed ratios.

For transmissions so equipped, the control system of the present invention further contemplates a fluid responsive valve apparatus arranged in the valve body for controlling a creeper mode of transmission operation. This valve apparatus is responsive to a fluid output from a fluid producing, electrically controlled solenoid.

The control system of the present invention further contemplates means for modulating master clutch operation as a function of fluid pressures in the valve body. Until a predetermined pressure flow is created in the valve body, the transmission will be prevented from transferring torque between the input and output shafts of the transmission thus protecting the powershift clutches disposed throughout the transmission.

In accordance with another aspect of the present invention there is provided a control valve for a fluid actuated master clutch of a transmission which is shiftable from a neutral position into multiple step forward and reverse conditions. The transmission includes a speed transmission assembly, a range transmission assembly, with the master clutch operably disposed therebetween for selectively coupling the speed and range transmission assemblies.

Such a control valve includes a valve body defining an inlet port to which fluid pressure is directed and an outlet port opening to the master clutch. A manual master clutch pressure modulation valve assembly is operably arranged in the valve body between the inlet port and outlet port. The purpose of the manual master clutch modulation valve assembly is to regulate operation of the master clutch in response to manual operation of an operator controlled clutch pedal so that modulated pressure of the fluid supplied to the master clutch is entirely at the discretion of the operator.

The control valve further contemplates an automatic master clutch pressure modulation valve assembly operably arranged in the valve body between the inlet port and the outlet port. This automatic master clutch pressure modulation valve assembly automatically regulates operation of the master clutch in response to continuing operating conditions of the transmission.

The automatic master clutch pressure modulation valve assembly includes a pressure reducing valve. The reducing valve is responsive to fluid pressure differentials applied thereagainst and which modulates the fluid pressure supplied to the master clutch outlet port anytime a shift is made from neutral condition or anytime a multi-step shift is made. By such construction, shifts between gear ratios are effected without considerable shift shock being detected by the operator.

The pressure reducing valve is preferably arranged for endwise displacement within the valve body. The pressure reducing valve defines axially spaced metering ports which are fluidically joined to each other. The metering ports cause the reducing valve to stay in one position during filling of the master clutch and then cause the reducing valve to move to a second position to meter flow to the master clutch during continuing operation of the transmission.

The automatic master clutch pressure modulation assembly further includes a resiliently biased piston. The piston is arranged for endwise displacement within a piston chamber defined by the valve body. The valve body further defines an exhaust port leading from the piston chamber. The pressure reducing valve blocks the exhaust port thus providing a relatively low pressure on the master clutch during master clutch filling and then provides a pressure modulation from the lowest possible initial pressure setting.

In combination with the master clutch control valve is an apparatus operably arranged in the valve body for preventing master clutch engagement under certain operating conditions of the transmission. More specifically, this apparatus will the tractor from moving when started in gear unless the transmission shift lever is first moved to a neutral position. To effect such ends, such apparatus includes a master clutch engagement valve which will block fluid flow to the master clutch when the inlet port in the valve body is pressurized and the transmission is in condition for forward or reverse operation. The master clutch engagement valve is resiliently biased into a initial position.

Other features and advantages of the present invention will become readily apparent from the following details description, appended drawings, and the accompanying claims.

BRIEF DESCRIPTION OF THE DRAWINGS

FIG. 1 is a schematic illustration of a powershift transmission;

FIG. 2 is an overall schematic illustration, partially in section, of a hydraulic system for controlling operation of the powershift transmission illustrated in FIG. 1;

FIG. 3 is an enlarged view, partially in section, of a group of hydraulic control valves illustrated in FIG. 2;

FIG. 4 is an enlarged view of a spring centering arrangement for a valve illustrated in FIG. 3;

FIG. 5 is an enlarged view of another spring centering arrangement for the same valve illustrated in FIG. 4;

FIG. 6 is an enlarged view, partially in section, of a starting switch assembly;

FIG. 7 is an enlarged view, partially in section, of another group of hydraulic control valves illustrated in FIG. 2;

FIG. 8 is an enlarged view, partially in section, of another group of hydraulic control valves illustrated in FIG. 2;

FIG. 9 is an enlarged view, partially in section, of a manual master clutch pressure modulation valve assembly;

FIG. 10 is an enlarged view, partially in section, of an automatic master clutch pressure modulation valve assembly;

FIG. 20 is a partial sectional view showing a valve of the hydraulic control system shifted into a position to effect a creeper mode of transmission operation.

DETAILED DESCRIPTION OF AS PREFERRED EMBODIMENT

Figure 11:
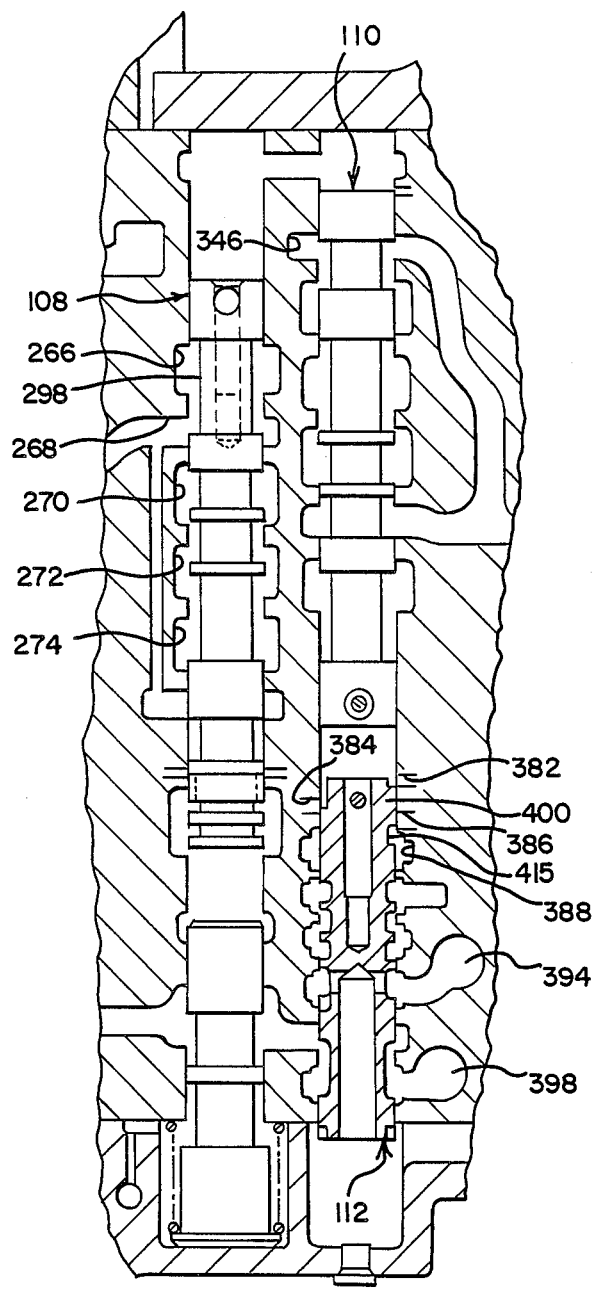
FIG. 11 is a partial sectional view illustrating that group of hydraulic control valves, illustrated in FIG. 7, in different operative positions.

Referring now to the drawings, wherein like reference numerals indicate like parts throughout the several views, the present invention relates to a transmission control system. More specifically, the present invention relates to a system for controlling a transmission of the type used in agricultural equipment such as tractors and the like.

FIG. 1 schematically discloses a powershift transmission 10. The transmission, shown for purposes of illustration, is shiftable among 27 forward speeds and 9 reverse speeds depending upon selective actuation of various hydraulic clutches disposed throughout the transmission. More particularly, transmission 10 includes a speed transmission assembly 12, a range transmission assembly 14, and a master clutch 16 for selectively connecting such transmission assemblies.

The speed transmission assembly 12 preferably includes a housing 18 which is adapted for connection to an internal combustion engine of the tractor. The speed transmission assembly further includes an input section 20, an output section 22, and a cluster gear assembly 24 for interconnecting the input and output sections 20 and 22.

The speed input section 20 preferably includes a pair of clutch operated drive gear assemblies 26 and 28 rotatably mounted on an input shaft 30. Input shaft 30 is rotatably mounted by the housing 18. Preferably, drive gear assembly 26 defines an odd-speed drive gear assembly and drive gear assembly 28 defines an even-speed drive gear assembly. The odd-speed drive gear assembly 26 is selectively connected to the input shaft 30 through actuation of clutch assembly 32. The even-speed gear assembly 28 is selectively connected to the input shaft 30 through actuation of a hydraulic clutch assembly 34.

The speed output section 22 preferably includes a speed output shaft 36 which is likewise rotatably supported by the housing 18 of the speed transmission assembly. As illustrated, shaft 36 carries one reverse speed output drive gear assembly 38 and three forward speed output drive gear assemblies 40, 42 and 44.

The reverse speed drive gear assembly 38 includes a hydraulically operated clutch assembly 46. Clutch assembly 46 operates to selectively connect the reverse speed output drive gear assembly 32 to the output shaft 36.

Gear assembly 40 defines a ½ forward gear assembly which includes a hydraulically operated clutch assembly 48. Clutch assembly 48 serves to selectively connect the drive gear assembly 40 to the output shaft 36.

Gear assembly 42 defines a ¾ forward gear assembly which includes a hydraulically operated clutch assembly 50. Clutch assembly 50 operates to selectively connect the forward output drive gear assembly 42 to the output shaft 36.

Gear assembly 44 defines a 5/6 forward gear assembly which includes a hydraulically operated clutch assembly 52. Clutch assembly 52 operates to selectively connect the speed output drive gear assembly 44 to the output shaft 36.

As illustrated, the speed transmission assembly 12 further includes a creeper drive assembly 54. A hydraulic clutch assembly 56 operates to selectively connect creeper drive assembly 54 to a countershaft 58 of the cluster gear assembly 26.

With the exception of master clutch 16, the various clutches disposed throughout the transmission and herein discussed are designed as powershift clutches. Such clutches preferably include some or all of the teachings disclosed in my copending patent applications, Ser. Nos. 138,201 and 184,813, filed Dec. 28, 1987 and Apr. 22, 1988, respectively; the full teachings of which are incorporated herein by reference.

The speed output shaft 36 of the speed transmission assembly 12 is connected to the master clutch 16 thereby transmitting speed output shaft torque thereto. Preferably master clutch 16 is a conventional, multiple disc, wet clutch including a hydraulically actuated piston which acts against a series of alternatively interleaved friction discs. The master clutch has the necessary heat capacity to slip under load thereby providing for modulated transmission engagement and also protecting the smaller powershift clutches disposed throughout the speed transmission assembly 12 and range transmission assembly 14.

The range transmission assembly 14 preferably includes a range input shaft 60, a range or transmission output shaft 62 and low, mid, and high range clutch assemblies 64, 66 and 68, respectively, interposed between the input and output shafts 60 and 62, respectively. The range input shaft 60 is connected to the master clutch 16 and is rotatably mounted in a range transmission housing 70. Range transmission housing 70 is tandemly arranged relative to the speed transmission housing 18.

The low range clutch assembly is rotatably mounted on a countershaft 72. Countershaft 72 is rotatably supported by the range transmission housing 70. The low range clutch assembly 64 includes a hydraulically operated clutch assembly 74. Clutch assembly 74 operates to selectively connect the low range clutch assembly 64 to the countershaft 72.

The mid range clutch assembly 66 includes a clutch assembly 76. Clutch assembly 76 operates to selectively connect the mid range clutch assembly 66 to the range input shaft 60.

Similarly, high range clutch assembly 68 includes a hydraulically operated clutch assembly 78. Clutch assembly 78 operates to selectively connect the high range clutch assembly 68 to the range input shaft 60.

A constant mesh gear arrangement 80 operates to interconnect countershaft 72 with the transmission output shaft 62.

A more detailed description of the above transmission 10 is provided in my copending patent application Ser.

No. 204,167 filed Jun. 8, 1988. The full teachings of that application are also incorporated herein by reference.

Although not shown here, it will be understood that speed and direction inputs to the transmission are preferably done manually through means of a single transmission shift lever of any known construction. Preferably, such a shift lever follows a generally W-shaped shift pattern provided in a shift gate. With such a shifting pattern, the transmission is placed in FORWARD and REVERSE driving speeds when the shift lever is placed in one or the other extreme outer legs of the W-shaped shift gate. The transmission will be conditioned in "PARK" when the shift lever is placed at an upper end of the central leg of the shift gate. The transmission is conditioned in NEUTRAL when the shift lever is placed in the lower most crossover portion interconnecting the central and outer legs of the gate. As will be understood, any other arrangement including single or multiple shifting levers would also be compatible with the present invention providing the transmission is shifted to neutral any time a direction change is made.

Operating fluid is supplied to and exhausted from eleven (11) clutches of the transmission through means of a hydraulic control system 100 shown schematically in FIG. 2. The control system 100 comprises a hydraulic pump 102 and a multi-piece, ported valve body 104 having a series of control valves and hydraulic conduits incorporated therein. The control valves included within the control system are: Forward, Neutral, Reverse (FNR) valve 106; speed selector valve 108; range selector valve 110; odd-even valve 112; master clutch control valve 114; range blocker valve 116; odd/even blocker valve 118; flow sensor valve 120; master clutch engagement valve 122; and, creeper valve 123.

Pressurized fluid is supplied to the hydraulic control system by pump 102. In its preferred form, pump 102 is a conventional fixed displacement gear type pump which draws fluid from a reservoir (not shown) and is capable of producing a fluid supply pressure of about 250 p.s.i. Pump 102 simultaneously delivers supply pressure to an accumulator 125 and various inlet ports in the valve body leading to FNR valve 106, master clutch valve 114, range blocker valve 116, and to the master clutch engagement valve 122.

As illustrated, FNR valve 106 is a spring centered valve arrangement having three operable positions "F", "N", or "R". Valve 106 is mechanically connected to the transmission shift lever. Although valve 106 requires only low actuating forces to be applied thereto to effect movement between its three operational positions, valve 106 is positively maintained in Forward (F) or Reverse (R) positions under relatively large forces. The purpose of FNR valve 106 is to selectively direct supply pressure to: clutch assembly 46 of the reverse speed output drive gear assembly 38; speed selector valve 108; range selector valve 110; and, odd/even valve 112.

Turning now to FIG. 3, the FNR valve 106 includes a valve spool 124 which is positionable in an axial bore 126 defined by the valve body 104. Axial bore 126 is divided into two separate chambers by a separator or divider 127. Valve body 104 further defines a fluid receiving chamber 128 and a plurality of axially spaced ports 130, 132, 134, 136, 138, 140, 141, 142, 144, 146, 148, 150 and 152, with each port intersecting with bore 126.

Port 130 is fluidically connected to and receives fluid supply pressure from pump 102 across a relatively small (1.0 mm) orifice 131 (FIG. 2). Port 132 is fluidically connected to the range blocker valve 116. Port 134 is fluidically connected to the range selector valve 110 (FIG. 2). Port 138 opens to clutch assembly 46 of the reverse gear assembly 38 and is fluidically connected, across a relatively small (1.0 mm) orifice 151, to an adjacent port 150. Port 140 is an inlet port which is fluidically connected to and receives supply pressure from pump 102. Port 141 is fluidically connected to speed selector valve 108 (FIG. 2). Port 144 is fluidically connected to the odd/even valve 112 (FIG. 2) and to the creeper valve 123 (FIG. 2). Port 146 is another inlet port which is fluidically connected to and receives supply pressure from pump 102. Port 152 is fluidically connected to chamber 128 and to odd/even valve 112. Ports 136, 142 and 148 open to exhaust.

Valve spool 124 is reciprocally arranged in axial bore 126 on one side of divider 127 and includes a stem section 155. Valve stem section 155 extends beyond the valve body 104 and is mechanically connected to the shift lever of the transmission. As such, the control system is compatible with a simple mechanical linkage. As illustrated, stem section 155 defines, in axially spaced relation, a peripheral groove 156 and a radial bore 157 extending through stem section 155.

Valve spool 124 further defines a series of axially spaced lands 158, 160, 162, 164, 166, 168, 170, 172 and 174 with annual grooves 176, 178, 180, 182, 184, 186, 188 and 190 between the lands, respectively. As seen in the drawings, stem section 155 has a smaller diameter than the diameter land of 158. As such a shoulder 159 (FIG. 5) is defined by the radial difference in diameters.

Valve spool 124 further defines an axially extended blind bore 192 having ports 194, 196, 198, 200 and 202 radially extending therefrom. Radial port 194 opens to groove 180. Radial port 196 opens to groove 182. Port 198 opens to groove 184. Radial port 200 opens to groove 188. Radial port 202 opens to land 172. Element 197 blocks fluid communication between radial ports 196 and 198. Element 201 blocks fluid communication between ports 200 and 202.

As will be understood, various apparatus could be used to spring center valve 106. In the illustrated embodiment, a pair of spring assemblies 204 and 206 act on opposite ends of the valve spool 124 to effect centering of valve 106 and, thereby, normally maintain the transmission shift lever connected thereto in a "Neutral" position.

As best seen in FIG. 4, spring assembly 204 includes a generally T-shaped pin 205 having a head portion 207 and a stem portion 209. Head portion 207 is sized to allow it to project into axial bore 192 when valve spool 124 is linearly shifted as seen in the drawings. Stem portion 209 is connected to and axially extends from separator 127. An annular washer 211 fits around the stem portion 209 and abuts against the head portion 207 under the influence of a double spring 213. Washer 211 engages valve spool 124 in a manner urging it upwardly as seen in the drawings. As will be understood, the extent of upward movement of valve spool 124, under the influence of double springs 213, is limited by the axial position of head portion 207 relative t divider 127.

As best seen in FIG. 5, in its presently preferred form, spring assembly 206 includes an annular washer 217 and a spring 208 acting in concert to resiliently urge valve spool 124 against the action of spring assembly 204. Washer 217 is accommodated within chamber 128 and fits around stem section 155 to abut against shoulder 159 on valve 106. As illustrated, washer 217 has a diameter greater than that of axial bore 126 and is downwardly biased under the influence of spring 208. As will be understood, washer 217 and spring 208 combine to resiliently urge valve spool 124 to the extent permitted by the limits of chamber 128.

A sleeve 210 is also accommodated in chamber 128 and is telescopically arranged about the stem portion 155 of spool 124. Sleeve 210 includes an inwardly directed sealing land 219. Bore 157, defined by stem section 155, has a diameter which is greater than the sealing area of land 219. Spring 208 also maintains the sleeve 210 in position within the chamber 128. Chamber 128 is open to exhaust when FNR valve 106 is in a neutral "N" position.

As seen in FIG. 6, a starting switch assembly 221 is operably associated with FNR valve 106. As illustrated, switch assembly 221 includes a spring biased, linearly movable spherical actuator 223 whose linear disposition controls a two-state switch 225 which produces an output signal indicative of whether the transmission is engaged in gear or in neutral. Groove 156 further includes ramps 227 and 229 on opposite sides of the groove 156.

Returning to FIG. 3, odd/even blocker valve 118 is arranged in axial bore 126 on the opposite side of divider 127. The purpose of the odd/even blocker valve 118 is to prevent fluid flow between an accumulator 238 and odd/even valve 112 (FIG. 2) in a manner reducing fluid pressure during clutch fill operations for either the odd or even drive gear assemblies 28, 30, respectively.

As illustrated in FIG. 3, the axial bore 126 in valve body 104 further includes axially spaced ports 240, 242 and 244. A spring chamber 246 is defined by the valve body 104 at one end of valve 118. Port 240 is fluidically connected to speed selector spool 108 (FIG. 2). Port 242 is fluidically connected to flow sensor valve 120, odd/even valve 112, and creeper valve 123 (FIG. 2). Port 244 is fluidically connected to the outlet of accumulator 238.

Valve 118 includes a valve spool 248 having lands 250 and 252 with a peripheral groove 254 disposed therebetween. A spring 256 biases valve spool 248 into an initial position. Valve spool 248 is arranged for endwise reciprocal displacement in axial bore 126 of valve body 104.

Range blocker valve 116 is likewise reciprocally arranged within valve body 104. The purpose of range blocker valve 116 is to prevent actuation of the low, mid, or high range clutch assemblies 64, 66, 68, respectively, when the master clutch 16 is disengaged or the transmission shift lever is in a neutral position. This prevents unexpected sharp deceleration of the tractor during multi-step down shifts.

As further illustrated in FIG. 3, range blocker valve 116 includes a valve spool 212 which is reciprocally arranged for endwise sliding movement in a stepped axial bore 214 defined by valve body 104. Valve body 104 further defines a plurality of axially spaced ports 216, 218, 220 and 222 all of which intersect with axial bore 214. Port 216 is fluidically connected to odd/even valve 112 and to master clutch valve 114. Port 218 opens to exhaust. Port 220 is fluidically connected to port 132 of the FNR valve 106.

Valve spool 212 includes a series of lands 224, 226, 228 and a stem 230 axially projecting from land 228 of the valve. It should be appreciated that the cross sectional area of land 224 is greater than the cross sectional area of lands 226 and 228. A peripheral groove 232 is arranged intermediate lands 226 and 228.

The speed selector valve 108 is likewise reciprocally arranged in the valve body 104. The purpose of speed selector valve 108 is to selectively direct regulated pressure, received from the FNR valve 106, to the ½ forward gear assembly 40, the ¾ forward speed output assembly 42, or the 5/6 forward speed output assembly 44, depending on the position of the transmission shift lever.

As best seen in FIG. 7, speed selector valve 108 is selectively positionable between three operable positions (1st, 3rd, and 5th) and includes a valve spool 260 reciprocally arranged in an axial bore 262 defined by valve body 104. Axial bore 262 has a plurality of axially spaced ports 264, 266, 268, 270, 272, 274, 276, 278 and 280 extending therefrom.

Port 266 opens to clutch assembly 48 of the forward speed of the ½ forward speed output assembly 40 and is fluidically connected to the master clutch valve 114. Inlet port 268 is fluidically joined to port 141 of FNR valve 106. Port 270 opens to clutch assembly 50 of the ¾ forward speed output assembly 42. Port 274 opens to clutch assembly 52 of the 5/6 forward speed output gear assembly 44. Port 276 is fluidically joined with inlet port 268. Port 278 opens to the range selector valve 110 and to port 240 of the odd/even blocker valve 118. Ports 264, 272 and 280 are exhaust ports.

Valve spool 260 includes a plurality of lands 282, 284, 286, 288, 290, 292, 294 and 296 with peripheral grooves 298, 300, 302, 304, 306, 308 and 310 disposed therebetween.

As illustrated, flow sensor valve 120 is axially aligned with speed selector valve 108 and is reciprocally arranged for movement within axial bore 262. Flow sensor valve 120 serves multiple purposes. Valve 120 serves to modulate master clutch pressure in the upper speed ratios of the transmission. Flow sensor valve 120 also protects the various powershift clutches disposed throughout the transmission if the pressure acting on the odd/even valve 112 falls below a predetermined pressure. In multi-step shifts, valve 120 operates to exhaust master clutch pressure in a manner modulating master clutch operation to effect smooth shifts between gear ratios. Moreover, when the transmission is shifted from a neutral condition, valve 120 prevents engagement of the master clutch 16 until fluid pressure throughout the system rises to a predetermined level.

In addition to those ports associated with valve 108, axial bore 262 further includes axially spaced ports 312 and 314. A fluid receiving spring chamber 316 axially aligned with and extending from axial bore 262 is further defined by the valve body 104. Spring chamber 316 has a larger diameter than does axial bore 262 thereby defining a radial shoulder 317.

Port 312 is an exhaust port which is fluidically joined to: odd/even selector valve 112; master clutch engagement valve 122; master clutch valve 114; and, across creeper valve 123 to one side of odd/even blocker valve port 118. Port 314 opens to the opposite side of odd/even blocker valve 118 and to the odd/even valve 112. Spring chamber 316 receives fluid from a three-way valve arrangement 335.

In its preferred form, flow sensor valve 120 includes a generally T-shaped valve spool 318 having a stem portion 320 and a head portion 322. Stem portion 320 of valve 120 includes lands 324, 326 and 328 with peripheral grooves 330 and 332 arranged therebetween. Land 328 has a greater cross sectional area than that of axial bore 262. Therefore, linear displacement of valve spool 318 is limited by the inner end of land 328 impinging against shoulder 317. A resilient member 334, in the form of a spring, is arranged in chamber 316 to act against head portion 322 of the valve whereby normally urging valve 120 into the position shown in FIG. 7.

Valve arrangement 335 is a conventional three way valve assembly. Valve arrangement 335 includes inlet ports 336, 337 and an outlet port 338. Inlet port 337 is fluidically connected to the creeper valve 123. Inlet port 336 receives pressurized fluid exhausted from port 242 of odd/even blocker valve 118 and from odd/even valve 112. Outlet port 338 opens to chamber 316 of flow sensor valve 120. A spherical valve element 339 is linearly shifted to fluically connect outlet port 338 to either of the inlet ports 336, 337 depending on which inlet port receives pressurized fluid.

As seen in FIG. 7, valve body 104 further defines another axial bore 340 which accommodates range selector valve 110 and odd/even valve 112 in axially aligned positions. The primary purpose of range selector valve 110 is to direct supply pressure from FNR valve 106 to the low, mid, or high range clutch assemblies 64, 66, 68 respectively, depending on the position of the transmission shift lever. Valve 110 also regulates fluid flow to the master clutch valve 114.

Axial bore 340 includes axially spaced ports 342, 344, 346, 348, 350, 352, 354 and 356. Port 344 is fluidically joined to the master clutch valve 114. Port 346 is fluidically joined to port 134 of the FNR valve 106. Port 348 opens to clutch assembly 74 of the low range clutch assembly 64. Port 352 opens to clutch assembly 76 of the mid range clutch assembly 66. Port 354 opens to the master clutch valve 114. Port 356 opens to clutch assembly 78 of the high range clutch assembly 68. Port 356 is also fluidically connected, across a relatively small (1.0 mm) orifice 357 (FIG. 2) to the master clutch valve 114. A check valve 359 is also included in the fluid connection between port 356 and master clutch valve 114. Moreover, port 356 is fluidically joined to port 278 of speed selector valve 108. Ports 342 and 350 open to exhaust.

Range selector valve 110 is selectively positionable between three operable positions (Lo, Mid, High) and includes a valve spool 358 adapted for endwise linear displacement within axial bore 340. Valve spool 358 includes lands 360, 362, 364, 366, 368 and 370. Peripheral grooves 372, 374, 376, 378 and 380 are arranged between the lands of the valve spool 358.

Odd/even valve 112 is likewise supported for reciprocal movement between three operable positions (Odd, Even, Neutral) in axial bore 340 of the valve body 104. The primary purpose of the odd/even valve 112 is to direct supply pressure from the FNR valve 106 to the odd/even drive gear assemblies 28 and 30, respectively, in an alternative manner, depending on the position of the transmission shift lever. Additional functions of the odd/even valve 112 include exhausting fluid pressure from the odd and even drive gear assemblies 28, 30, and from the master clutch 16, if the actuation mechanism for the transmission control system prematurely stops or sticks between gears during a shift. The odd/even valve 112 furthermore regulates fluid pressures acting to hold FNR valve 106 in its forward or reverse position. Moreover, when in its neutral position, the odd/even valve 112 sends a pressure signal to the range blocker valve 116 indicative of valve 112 being in a neutral position. This pressure signal to valve 116 blocks actuation of the range clutch assemblies thereby preventing torque transfer through the transmission. Additionally, odd/even valve 112 exhausts pressure to the master clutch engagement valve 122 when valve 112 is in a neutral position.

Axial bore 340 further includes axially spaced ports 382, 384, 386, 388, 390, 392, 394, 396, and 398. Port 382 is fluidically joined to the master clutch engagement valve 122 and opens to exhaust. Port 384 is fluidically joined to port 152 of FNR valve 106 and to chamber 128 of FNR valve 106. Port 386 is fluidically connected to port 216 of the range blocker valve 116 and to the master clutch valve 114. Port 388 is fluidically connected to: port 144 of FNR valve 106; port 390 (across an orifice 387 and check valve 389 (FIG. 2));creeper valve 123; master clutch engagement valve 122; and, port 392 of flow sensor valve 120 (across check valve 391 (FIG. 2)). Port 394 opens to the clutch assembly 34 associated with the even drive gear assembly 30. Port 396 opens to port 314 of the flow sensor valve 120. Port 398 opens to clutch assembly 32 of the odd drive gear assembly 28. Port 392 opens to exhaust.

The odd/even valve 112 includes a valve spool 400 reciprocally arranged in axial bore 340. Valve spool 400 includes lands 402, 404, 406, 408, 410 and 412. Peripheral grooves 416, 418, 420, 422, and 424 are provided intermediate the lands. A notch or groove 414 is provided at one end of land 402.

Another notch or groove 415 is provided between ends of land 402. Notch or groove 428 is also provided at an outer end of land 412. Another groove 429 is provided at an inner end or land 410. Valve spool 400 also includes an axially extending blind bore 430. Blind bore 430 has a radial bore 432 leading therefrom which fluidically connects bore 430 with groove 422.

Speed selector valve 108, range selector valve 110, and odd/even valve 112 act in concert with each other to effect quality shifts between gear ratios. The position of each of those valves within the valve body 104 can be effected mechanically, hydraulically or electrically. As illustrated, each valve 108, 110 and 112 is preferably operated mechanically by a shift cam which in turn, is operated by the shift lever of the transmission. My copending U.S. patent application Ser. No. 190,493, filed May 5, 1988 describes a valve actuating mechanism which effects synchronized movement of such valves relative to each other in response to shift lever movement to assure such quality shifts between gear ratios. The full teachings of that copending patent application are incorporated herein by reference.

Turning now to FIG. 8, valve body 104 further defines another elongated axial bore 440 which is divided lengthwise by a divider or separator 442. Axially spaced along the length of bore 440 are chambers 444, 446 and 448 and 462. A series of axially spaced ports 450, 452, 454, 456, 458 and 460 are also defined along the length of axial bore 440.

Port 450 receives supply pressure from the hydraulic pump 102 and is fluidically joined to the master clutch engagement valve 122. Port 452 opens to master clutch 16 and defines a master clutch outlet port. Port 454 is likewise fluidically connected to the master clutch engagement valve 122 and defines a master clutch inlet port. Port 456 is likewise fluidically joined to the master clutch engagement spool 122 and to port 312 of the flow sensor valve 120 across a pair of relatively large (4.0. mm) orifices 457 and 459 (FIG. 2) arranged in series relative to each other. Port 458 is fluidically joined to port 354 of the range selector spool 110.

Chamber 446 also includes a series of axially spaced ports 464, 466 and 468. Port 468 is fluidically joined to port 460 and defines a "feedback" loop. Port 464 is fluidically joined to port 344 of the range selector valve 110. Port 466 is fluidically joined to port 266 of the speed selector valve 108 which opens to the ½ forward clutch assembly.

Chamber 462 is fluidically joined to: chamber 446; range selector valve 110; odd/even valve 112; flow sensor valve 120; FNR valve 106, master clutch engagement valve 122, creeper valve 123. The fluid connection between chamber 462 and range selector valve 110 includes orifice 357 and check valve 359 (FIG. 2). Chamber 462 is fluidically connected to ports 388 and 390 of valve 112 across check valves 389 and 391(FIG. 2). Chamber 462 is fluidically connected to master clutch engagement valve 122 across another check valve 447. Chamber 462 is also fluidically connected to valve 123 across orifice 387 and check valve 391 (FIG. 2). Moreover, chamber 462 is also fluidically connected to port 144 of FNR valve 106.

Master clutch control valve 114 is operably arranged in the valve body between an inlet port and an outlet port leading to the master clutch 16. Master clutch control valve 114 includes a manual master clutch pressure modulation valve assembly 469 arranged on one side of separator 442 and an automatic master clutch pressure modulation valve assembly 471 arranged on the opposite side of separator 442. The manual clutch pressure modulation assembly 469 operates to control operating pressure to the master clutch 16 in response to manual operation of the clutch pedal. The automatic clutch pressure modulation assembly 471 automatically modulates master clutch pressure during operation of the transmission in a manner protecting the powershift clutches disposed throughout the transmission.

As best seen in FIG. 9, clutch pressure modulation assembly 469 is operable between a disengaged position (D) and an engaged position (E). Clutch pressure modulation includes a control spool stem 470 and a spool valve 472 arranged in combination with each other. In its preferred form, control spool stem 470 is a generally T-shaped member having a stem portion 474 and a head portion 476. The stem portion 474 is slidably arranged in the axial bore 440 for endwise displacement and includes a peripheral groove 478 along its axial length. The free end of control spool stem 470 extends beyond valve body 104 and is mechanically linked to the operator controlled clutch pedal (not shown) of the tractor. The head portion 476 of the control spool stem 470 is slidably accommodated in chamber 444. When master clutch valve 114 is in its disengaged position, head portion 476 abuts against a shoulder 480 defined by a forward wall of chamber 444. Control spool stem 470 further includes an axially extending blind bore 482.

Spool valve 472 is reciprocally arranged for endwise sliding movement in axial bore 440 and includes lands 484 and 486 with a peripheral groove 488 disposed therebetween. Valve spool 472 further defines an axial bore 502 extending therethrough. A radially extending orifice 504 extends from axial bore 502 and opens to land 484. A second orifice 506 extends from the axial bore 502 and opens to groove 488. Notches 505 and 507 are further defined y valve spool 472.

Valve stem 470 and valve spool 472 are mechanically interconnected by a lost motion mechanism 510. In the illustrated embodiment, the lost motion mechanism includes a tubular sleeve 512 arranged in combination with a T-shaped pin 514. Sleeve 512 is fixedly arranged in the axial bore 482 defined by stem 470. The T-shaped pin 514 includes a stem portion 516 and a head portion 518. Stem portion 516 slides through tubular sleeve 512 and is connected to the spool valve 472 on one side of sleeve 512. The head portion 518 of pin 514 is accommodated for limited axial movement within the axial bore 482 on the opposite side of sleeve 512.

Lost motion mechanism 510 combines with a limit stop assembly 515 and a spring assembly 517 to initially position spool valve 472 axially within bore 440. In its preferred form, limit stop assembly 515 includes a pair of annular elements 519 and 521 which combine to limit upward movement of valve spool 472, as seen in the drawings.

Annular element 519 is affixed to valve body 104 and projects radially inward toward valve spool 472. Annular element 519 is apertured to allow valve spool 472 to pass therethrough. Annular element 521 is carried by valve spool 472 and extends radially outward therefrom. As illustrated, elements 519 and 521 combine to limit axial displacement of valve spool 472 in a first axial direction.

Spring assembly 517 includes a series of springs 523, 525 and 527. Springs 523 and 525 urge valve spool 472 away from stem section 470 to the extent allowed by the lost motion mechanism 510. As seen, the lost mostion mechanism 510 limits free axial displacement of valve spool 472 in the other axial direction. Preferably, springs 523 and 525 are prestressed when assembled within the valve body. As will be appreciated, spring 527 is provided to increase, in a stepped fashion, the master clutch operating pressure during manual operation of master clutch valve 114.

Turning now to FIG. 10, the automatic modulation assembly 471 of the master clutch valve 114 includes a pressure reducing valve 524, a master clutch piston 526 and a spring mechanism 528. As seen in the drawings, reducing valve 524 has a relatively small cross sectional area compared with that of master clutch piston 526. The purpose of the assembly 471 is to meter fluid flow to the master clutch 16 at an automatically controlled rate and to maintain the master clutch pressure at three different levels (150, 180 or 270 p.s.i.) depending upon which gear ratio is selected by the operator.

Reducing valve 524 is adapted for endwise displacement within axial bore 440. A prestressed spring 531 acts to hold valve 524 in position with a predetermined resilient force (i.e. 20 p.s.i.). Valve 524 defines a blind axial bore 532. Valve 524 further defines axially spaced ports 534, 536 and 538 radially extending from and which are fluidically joined by axial bore 532. An orifice 540, defined by a rear wall of valve 524 also communicates with the axial bore 532. A screen 542 filters fluid passing from axial bore 532 to orifice 540.

Master clutch piston 526 is slidably accommodated within chambers 446 and 462. Spring mechanism 528 is arranged to urge master clutch piston 526 in a direction opposite to the fluid pressures acting thereagainst. As illustrated, spring mechanism 528 includes a T-shaped member 546 which is slidably accommodated within chamber 448. Chamber 448 is larger in diameter than is chamber 446 and defines a radially extending wall 548 defining a limit stop for member 546. Spring mechanism 528 further includes a relatively low force spring 550 arranged on one side of member 546 and a pair of springs 552 and 554 arranged on the opposite side of member 546. Springs 550, 552 and 554 act conjointly to urge master clutch piston 526 toward valve 524.

Master clutch engagement valve 122 is also reciprocally arranged within valve body 104. The purpose of the master clutch engagement valve 122 is to prevent engagement of the master clutch 16 under certain operating conditions of the transmission. More specifically, valve 122 prevents engagement of the master clutch 16 if the tractor is started "in gear". As seen in FIG. 8, the master clutch engagement valve 122 includes a valve spool 576 which is adapted for endwise reciprocation in an axial bore 560 defined by valve body 104.

As illustrated in FIG. 8, valve body 104 further defines a plurality of axially spaced ports 562, 564, 566, 568, 570 extending from axial bore 560 and a spring chamber 572 disposed at one end of valve 122. Port 562 acts as an inlet port which receives supply pressure from pump 102. Port 562 is also fluidically joined to port 450 of master clutch valve 114. Port 566 is fluidically connected to master clutch inlet port 454. Port 568 is fluidically joined to port 456 of valve 114 and to exhaust port 312 of flow sensor valve 120 across the relatively large orifices 457 and 459. Port 570 is fluidically joined, across a relatively small (2.0 mm) orifice 581 (FIG. 2) to port 562. Chamber 572 is fluidically connected to port 382 of the odd/even valve 112.

Valve spool 576 includes lands 578, 580 and 582 with peripheral grooves 584 and 586 therebetween. Valve spool 576 further defines two axial and oppositely extending blind bores 588 and 590. Radially extending from the blind bore 588 and opening to groove 584 is a radial port 592. Another radial port 594 extends from bore 590 and opens to land 580. Valve spool 576 is urged into an initial position by a spring 596 arranged in chamber 572.

Returning to FIG. 3, creeper valve 123 includes a valve spool 600 adapted for endwise movement in an axially extended bore 602 defined by valve body 104. In control valve systems so equipped, valve 123 serves a plurality of purposes. First, when valve 123 is operated, it blocks the flow of fluid from port 390 of valve 112 to the odd and even outlet ports 398, 394, respectively, of odd/even valve 112. Second, when valve 123 is operated, it exhausts the clutch pressure in the odd or even clutch assemblies 32, 34, respectively. Moreover, when valve 123 is operated, supply pressure normally directed to the odd or even outlet ports 398, 394, respectively, of valve 112 is redirected to clutch assembly 56 associated with creeper drive assembly 54.

Valve body 104 further defines axially spaced ports 604, 606, 608 and 610 extending from bore 602. A spring chamber 612, which is open to exhaust, is arranged at one end of the valve spool 600. Port 604 receives fluid inputs from an ON/OFF solenoid actuated fluid output valve 614. Solenoid 614 is arranged in series between inlet port 604 and hydraulic pump 102. Port 606 is fluidically connected to port 242 of the range blocker valve 116. Port 608 is fluidically connected to: port 386 of odd/even valve 112 across check valve assembly 389 (FIG. 2); port 388 of odd/even valve 112 across orifice 387 (FIG. 2); chamber 462 of master clutch valve 114 across check valve assembly 391 (FIG. 2); and, port 586 of master clutch engagement valve 122. Port 610 opens to the clutch assembly 56 of the creeper drive assembly 54 and to port 336 of the three way valve arrangement 335 (FIG. 7).

Valve spool 600 includes lands 620, 621, 622, 624 and an axially extending hollow stem 626. Peripheral grooves 627, 629 and 631 are provided between the lands. Valve spool 600 further defines an axially extending bore 628 with radial ports 630 and 632 which open to grooves 627 and 631. Valve stem 626 further defines one or more ports 636 which open from axial bore 628. A spring 634 acts to bias valve spool 600 into a predetermined position.

Operation of the control system according to the present invention will now be described to insure a complete understanding thereof. Preferably, the tractor is started with the transmission shift lever in a "PARK" or "NEUTRAL" position. With the shift lever in the "PARK" position, a lock pawl (not shown) preferably engages with the constant mesh gear set 80 of the transmission 10 in a manner locking the transmission in a static position. When the tractor engine is started, a relatively high fluid supply pressure (approx. 250 p.s.i.) is produced by pump 102 and which is available to the control system 100.

Supply pressure from pump 102 is ported to the following locations in the control valve. Supply pressure from pump 102 passes to port 146 of FNR valve 106 (FIG. 3). Supply pressure from pump 102 passes through a relatively large (4.5 mm) orifice 127 to accumulator 125 (FIG. 3). Accumulator 125 will be charged to approximately 270 psi at the start of the tractor. Supply pressure is likewise directed to port 222 (FIG. 3). Supply pressure directed to port 222 flows to port 140 of FNR valve 106 and also acts against one end of the range blocker spool 116. Supply pressure from pump 102 also flows across orifice 131 and is presented to port 130 of FNR valve 106. From pump 102, supply pressure is also presented to port 450 of master clutch valve 114 (FIG. 8) and to port 562 of master clutch engagement valve 122. Supply pressure passing to port 570 of master clutch engagement valve 122 crosses orifice 581 and is delivered to port 570. Supply pressure from pump 102 is also directed to the electrically controlled solenoid 614 associated with the creeper drive assembly 54.

With the transmission shift lever in a "PARK" position, FNR valve 106 assumes a neutral "N" position substantially as shown in FIG. 3. With FNR valve 106 so disposed, supply pressure presented to port 146 enters port 200, crosses axial bore 192, and is exhausted from port 198 into port 141. From port 141, fluid flows to inlet port 268 of the speed selector valve 108 (FIG. 7). From inlet port 268 fluid flows to and engages one of the forward output speed assemblies 40, 42 or 44 depending on the disposition of valve 108.

Supply pressure fluid passing to port 140 of FNR valve 106 enters port 196 and crosses axial bore 192 and is exhausted from port 194 into port 138. From port 138, fluid flows to and engages the reverse clutch assembly 46 of the reverse speed output drive gear assembly 38. Since both the reverse speed output drive gear assembly 38 and one of the forward output speed drive gear assemblies 40, 42 or 44 are both engaged, the transmission is locked with the speed transmission 12 and the range transmission 14 disengaged. The tractor engine is, therefore, free to rotate and the tractor is free to coast but no drag torque will be transmitted from the engine to the wheels of the tractor.

When FNR valve 106 is in its neutral "N" position, land 158 on valve spool 124 blocks port 130. Therefore, the supply pressure presented to port 130 has substantially no effect when FNR valve 106 is in a Neutral position.

When the transmission shift lever is moved from a "PARK" to a "NEUTRAL" position, FNR valve 106 remains in its neutral "N" position. Valves 108 and 112 are linearly shifted by the valve actuating mechanism into the positions illustrated in FIG. 11. More specifically, the valve actuating mechanism positions speed selector valve 108 to allow supply pressure to pass from inlet port 268 in a manner effecting engagement of clutch assembly 48 of the ½ forward output drive gear assembly 40. Ports 270 and 274 opening to the ¾ and 5/6 forward gear assemblies 42 and 44, respectively, are open to exhaust through port 272.

Simultaneously therewith, the valve actuating mechanism positions odd/even valve 112 in a "NEUTRAL" position, illustrated in FIG. 11. With odd/even valve 112 in a "NEUTRAL" position, valve spool 400 opens both the even and odd ports 394 and 398, respectively and port 382 to exhaust. Opening ports 394 and 398 to exhaust also opens the even and odd drive gear assemblies 30 and 28 to exhaust. With port 382 open to exhaust, the pressure in chamber 572 of master clutch engagement valve 122 (FIG. 8) is reduced. As such, the supply pressure presented to port 562 of master clutch engagement valve 122 enters port 592, crosses to the end of spool 576 via axial bore 588, and shifts valve 122 to the right against the action of spring 596 and into the position as shown in FIG. 8.

With the master clutch engagement valve 122 shifted into the position illustrated in FIG. 8, land 582 blocks fluid flow between port 570 and chamber 572. Moreover, with valve 122 shifted, chamber 572 is connected to exhaust port 564 through axial bore 590. Supply pressure continually presented to port 562 from pump 102, and acting against the opposite end of master clutch engagement valve 122, maintains spool 576 in its shifted position. The spool 576 will not return to its other position under the influence of spring 596 until the tractor is shutoff and the supply pressure from pump 102 falls beneath a predetermined level. Movement of spool 576, into its shifted position, fluidically connects inlet port 568 with master clutch inlet port 454 of master clutch valve 114 and disconnects port 454 from exhaust port 564.

Positioner springs (not shown) associated with the clutch pedal, operate to normally hold master clutch control valve 114 in its engaged position (E) illustrated in FIG. 9. Thus, master clutch valve 114 is prepared to receive operating pressure fluid when the transmission is shifted out of "NEUTRAL".

When the operator desires to condition the tractor for either "FORWARD" or "REVERSE" movements, the transmission shift lever is moved from its "NEUTRAL" position toward the "FORWARD" or "REVERSE" gear ranges. Because FNR valve 106 is mechanically connected thereto, movement of the transmission shift lever toward the "FORWARD" or "REVERSE" gear ranges causes linear displacement of the FNR valve 106. The valve actuating mechanism maintains valves 108, 110 and 112 in position ready for operation.

When valve 106 and, thereby, the transmission shift lever connected thereto, are in a neutral "N" position, actuator 223 of switch 225 is accommodated in groove 156 between ramps 227 and 229 as schematically illustrated in FIG. 6. When the transmission shift lever is shifted to condition the transmission into either FORWARD or REVERSE, the valve 106, including stem 155, linearly moves therewith toward one of its other two positions "F" or "R". When stem 155 is linearly shifted, actuator 223 is forcibly displaced by either ramp 227 or 229 (depending on the direction of movement of stem 155) thereby causing switch 225 to change state indicating that the transmission is not in a NEUTRAL condition. The state of switch 225 determines whether the tractor engine can be started in a normal operation.

Figure 12:
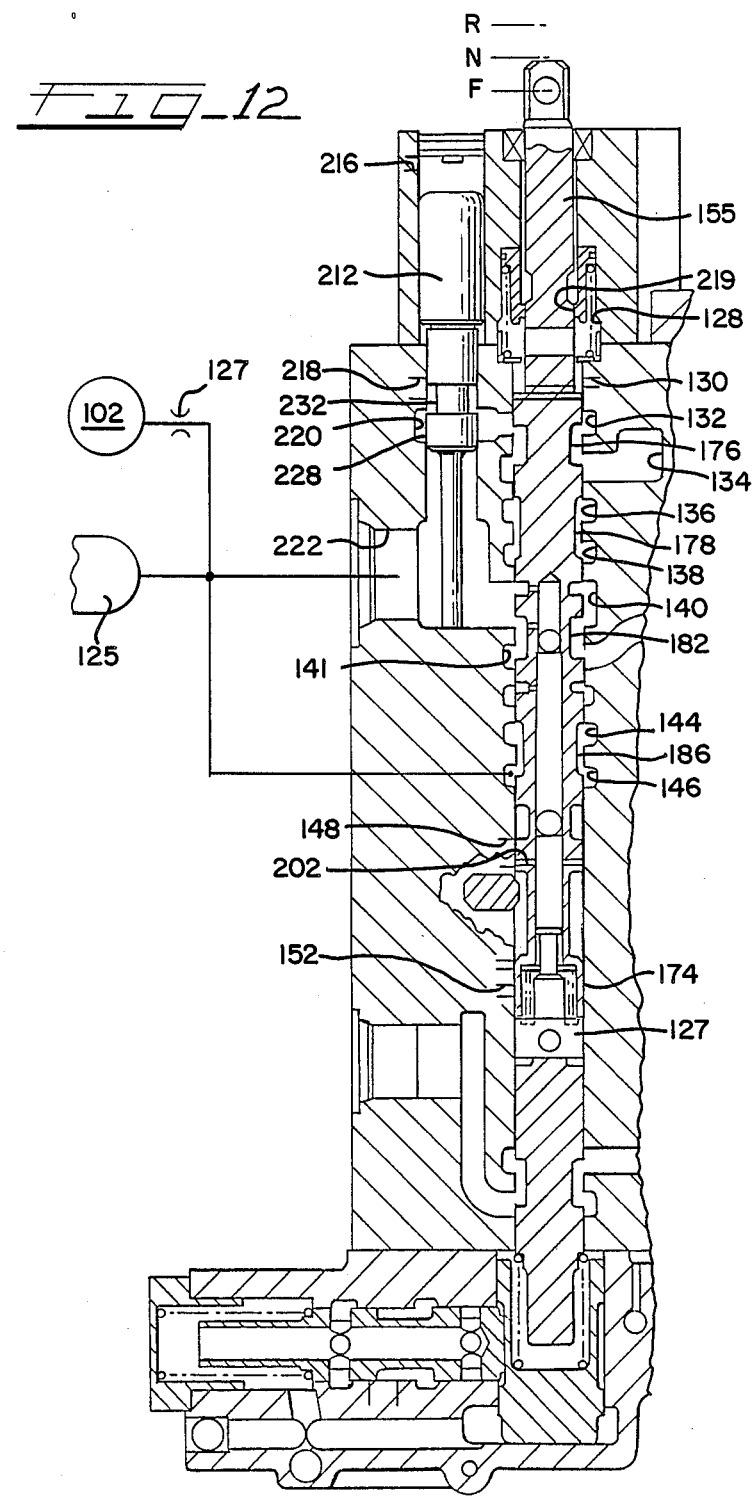
FIG. 12 is a partial sectional view illustrating one valve, in the group of hydraulic control valves illustrated in FIG. 3, in a shifted position.

Assuming that a FORWARD speed range is selected by the operator, movement of the transmission shift lever toward a FORWARD gear range causes FNR valve 106 to linearly shift into the position illustrated in FIG. 12. In such position, chamber 128 of FNR valve 106 is prevented from exhausting along stem 155. That is, sealing land 219 cooperates with stem 155 to prevent chamber 128 from exhausting along stem 155. Shifting of valve 106 fluidically joins radial port 202 with exhaust port 148. As such, and as seen in the drawings, the lower end of valve 106 will therefore, be open to exhaust through axial bore 192 fluidically communicating with port 202. Shifting of FNR valve 106 will also cause land 174 to block port 152.

Moreover, shifting of valve 106 allows supply pressure from pump 102 to pass from port 130 into spring chamber 128. Although supply pressure fluid is allowed to pass into spring chamber 128, pressure does not rise in chamber 128. Although fluid passing into chamber 128 is prevented from exhausting along stem 155 by sealing land 219, chamber 128 is connected to exhaust. Chamber 128 is connected to exhaust through a fluid connection with port 384 of odd/even valve 112 (FIG. 11) which is open to exhaust as a result of the linear shifting of valve 112 into its NEUTRAL position by the valve actuating mechanism. Thus, valve 106 and, thereby, the transmission shift lever connected thereto, will return to a "NEUTRAL" position under the influence of centering spring 204 if the transmission shift lever is released by the operator before being moving into a forward or reverse gear range.

As a result of FNR valve 106 being shifted, port 136, opening to reverse clutch assembly 46 of the reverse speed drive gear assembly 38, is connected to exhaust port 136 across groove 178. Shifting of valve 106 also allows supply pressure from pump 102 to pass from port 222 to port 140, across groove 182, and enter port 141. From port 141 supply pressure passes to inlet port 268 of speed selector valve 108 (FIG. 11). Because speed selector valve 108 has been positioned by the valve actuating mechanism into its "1st" position, supply pressure presented to inlet port 268 crosses groove 298 and enters port 266. From port 266 high pressure fluid flows to and engages clutch assembly 48 of the ½ forward gear assembly 40. Because the ½ forward speed output drive gear assembly 40 is pressurized through an annulus opening rather than orifices, this large opening offers low flow restriction and permits high flow rates from the accumulator 125 to effect rapid fill clutch actuation of the gear assembly during shifting with a gradual pressure rise after clutch fill operation.

With FNR valve 106 shifted into its forward (F) position (FIG. 12) port 144 will be fluidically connected across groove 186 to the supply pressure presented to port 146 from pump 102. As such, supply pressure is directed to port 388 of valve 112. With odd/even valve 112 shifted into its "NEUTRAL" position by the valve actuating mechanism, the even and odd outlet ports 394 and 398, respectively, are open to exhaust.

As seen in FIG. 11, port 388 of valve 112 is fluidically joined to port 386 across slot 415. The supply pressure passing from port 386 is directed as signal pressure to port 216 of the range blocker spool whereby urging the range blocker spool 116 into the position illustrated in FIG. 3. Because of the cross sectional size differences between lands 224 and 228, a pressure differential is applied against spool 212 of range blocker valve 116 when a signal pressure is directed to port 216. This pressure differential acts on valve 11 causing spool 212 to shift downwardly from the position illustrated in FIG. 2 to the position illustrated in FIG. 3.

With range blocker valve 116 shifted into the position shown in FIG. 3, land 228 blocks port 220 from receiving supply pressure. Because port 220 is blocked, port 132 of FNR valve 106 does not receive supply pressure. Moreover, the shifting of range blocker valve 116 does allow port 132 of FNR valve 106 to fluidically communicate with exhaust port 218 across groove 232 of spool 212. As a result of the shifting of FNR valve 106 into a forward "F" position (FIG. 12), port 134 is fluidically connected to port 132 across groove 176. However, no pressure is present at port 132 because the shifted land 228 of range blocker spool 116 blocks off port 132 from fluid connection with port 222. Because no supply pressure is passed to port 132, none of the range clutch assemblies are engaged and, thus, the transmission will not transfer power or torque between the input shaft and output shaft until the transmission shift lever is further moved into a forward or reverse gear range.

To effect "FORWARD" operation of the tractor, the transmission shift lever is moved to a first gear position. Simultaneously therewith, the valve actuating mechanism is moved by the transmission shift lever into its first gear position causing odd/even valve 112 to be move from its "NEUTRAL" position to an "ODD" position (1st gear) illustrated in FIG. 13.

Figure 13:
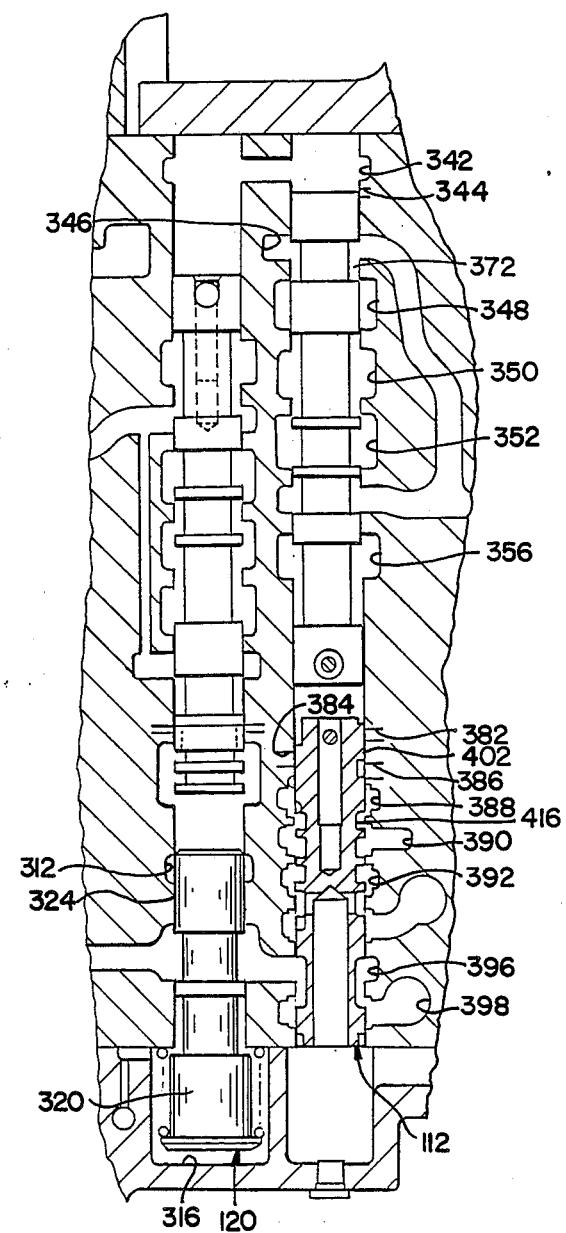
FIG. 13 is another partial sectional view illustrating that group of hydraulic control valves, illustrated in FIG. 7, in still other operative positions.

With odd/even valve 112 in an "ODD" position, as illustrated in FIG. 13, land 402 blocks fluid communication between ports 388 and 386. Because port 386 is blocked from fluid communication with port 388, the signal pressure fluid delivered to port 216 of valve 116 is reduced. Spool 212 of valve 116 is, therefore, moved upward into the position illustrated in FIG. 2 as a result of the pressure differential acting against cross sectional area of land 228 from port 222.

With range blocker valve 116 in the position illustrated in FIG. 2, and with FNR valve 106 shifted to its Forward "F" position (FIG. 12), port 132 of valve 106 is disconnected from exhaust port 218 by land 228 and is open to supply pressure fluid from port 222. Thus, supply pressure fluid flows from port 222, to port 132 of FNR valve 106, across groove 176 to port 134 of valve 106. Supply pressure fluid delivered to port 134 is then delivered to port 346 of range selector valve 110 (FIG. 13).

Along with shifting odd/even valve 112 to its "ODD" position, the valve actuating mechanism for the transmission likewise shifts range selector valve 110 into its "Lo" position in response to movement of the transmission shift lever into a first forward gear range. As illustrated in FIG. 13, in its "Lo" position range selector valve 110 directs supply pressure from port 346 to the low range clutch assembly 64 in a manner engaging clutch assembly 74. More specifically, because valve 110 has been shifted by the valve actuating mechanism into its "Lo" position, the supply pressure fluid delivered to port 346 is directed to port 348 across groove 372. From port 346, supply pressure is likewise available to inlet port 458 of master clutch valve 114 (FIG. 8). Ports 352 and 356, which open to the other range clutch assemblies are open to exhaust.

As best illustrated in FIG. 10, supply pressure fluid delivered to port 458 of master clutch valve 114 passes through port 538 of valve 524, across axial bore 532, and is exhausted into chamber 456 through port 534. Turning to FIG. 8, the fluid exhausted into chamber 456 is directed to port 568 of the master clutch engagement valve 122. Because of its shifted state, master clutch engagement valve 122 allows fluid to pass from port 568, across groove 586, and be presented to the master clutch inlet port 454. With the manual master clutch pressure modulation assembly 469 normally "Engaged", fluid presented to inlet port 454 crosses groove 488 and is passed to master clutch outlet port 452. The fluid passing to port 452 "fills" the master clutch 16.

During filling of the master clutch 16, pressure reducing valve 524 of master clutch valve 114 is metering flow to both the master clutch 16 (in the manner described above) and to exhaust port 312 of flow sensor valve 120. The fluid connection between port 586 of valve 122 (FIG. 8) and exhaust port 312 of flow sensor valve 120 (FIG. 7) includes orifices 457 and 459 which lower the fluid pressure (in the current embodiment 20 p.s.i) exhausted at port 312. The position of valve 524 and, thereby, the metering effect thereof, is controlled by the equilibrium of the force developed by spring 531 acting to urge valve 524 upwardly, as seen in the drawings, and the fill pressure flowing to the master clutch acting to push valve 524 downwardly against the action of spring 531.

With FNR valve 106 in its forward "F" position (FIG. 12), supply pressure is directed to port 388 of odd/even valve 112. With odd/even valve 112 in an "ODD" position, as illustrated in FIG. 13, supply pressure directed to port 388 flows across groove 416 and enters port 390. From port 390 supply pressure flows to odd inlet port 396 across orifice 387, creeper valve 123, odd/even blocker valve 118, and flow sensor valve 120. Orifice 387 causes a reduction in the pressure flowing to port 396. As the pressure in clutch assembly 32 of the odd gear assembly 28 rises, it also charges accumulator 238 (FIG. 3).

The pressure rise during filling of the odd clutch assembly 32 is directly related to the pressure rise at port 242 of odd/even blocker valve 118. From port 242 of odd/even blocker valve 118, fluid flows to inlet port 337 of the three-way valve arrangement 335. Fluid entering port 337 is exhausted at port 338 to chamber 316 of flow sensor valve 120. When sufficient pressure (approximately 100 p.s.i.) builds in chamber 316 (equal to the pressure rise in the on-coming odd clutch assembly 32), valve spool 320 is shifted against the action of spring 334 into a position illustrated in FIG. 13.

When valve 120 is shifted into the position illustrated in FIG. 13, land 324 thereof blocks port 312 of flow sensor valve 120. Blocking of port 312 disconnects port 568 of master clutch engagement valve 122, port 390 of odd/even valve 112, and chamber 462 of master clutch valve 114 from exhaust. It should be noted, that as long as port 312 was open to exhaust, piston chamber 446 was also connected to exhaust through check valve 447. Connecting chamber 446 of valve 114 to exhaust caused a delay in the increase of master clutch pressure until odd clutch assembly 32 reached a predetermined pressure level. The predetermined pressure level is established by spring 334 acting against the flow sensor valve 120. Blocking of port 312 to exhaust, however, allows master clutch operating pressure to increase.

Figure 14:
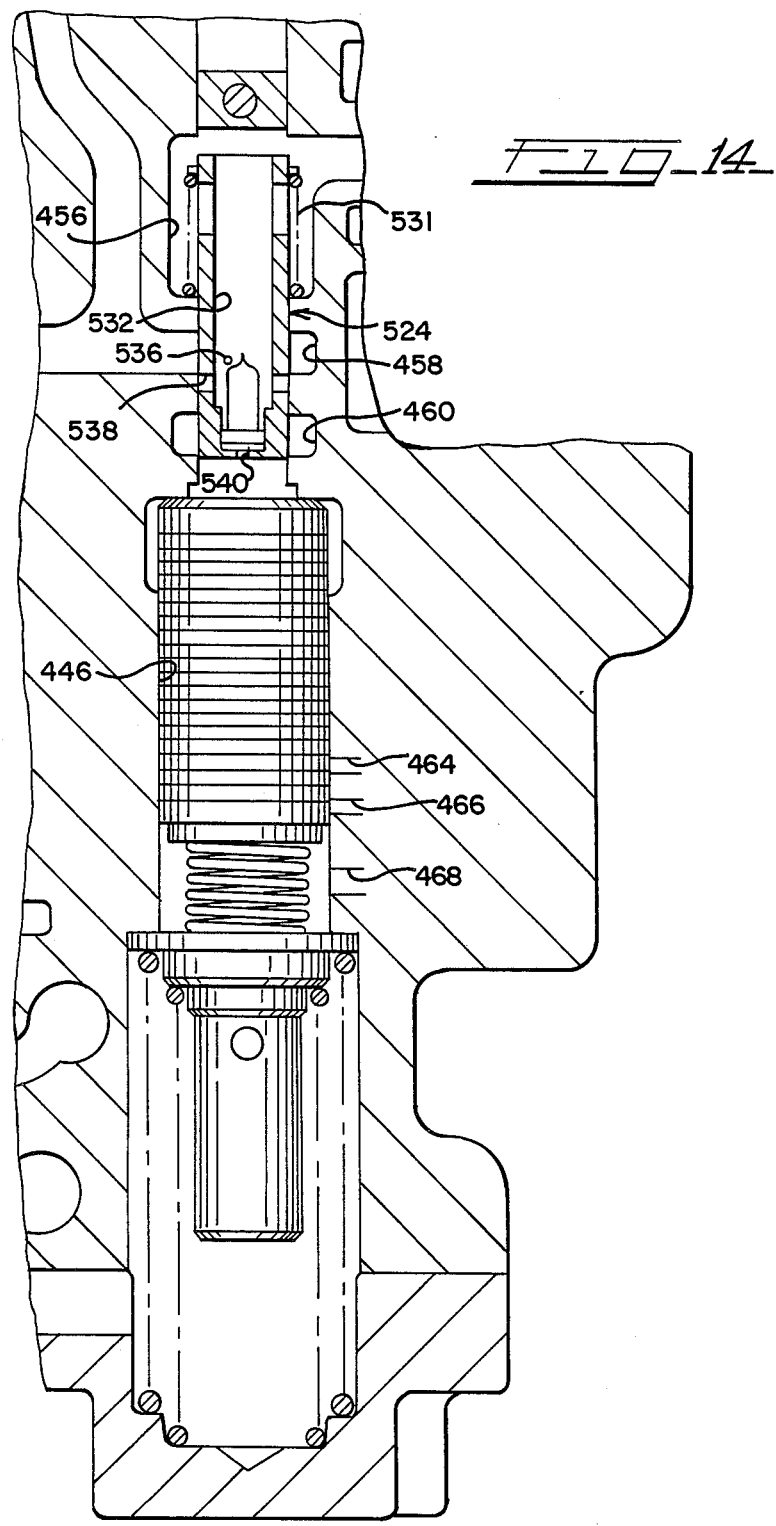
FIG. 14 is a view similar to FIG. 10 illustrating a shifted position of a pressure reducing valve forming part of the automatic master clutch pressure modulation valve assembly.

As the master clutch operating pressure rises, pressure reducing valve 524 will be pressed downward by fluid pressure acting against spring 531. As seen in FIG. 14, sufficient displacement of valve 524 against the action of spring 531, eventually blocks the fluid flow through radial bore 538 into bore 532. After port 538 is blocked a metered fluid flow is established between port 458 and axial bore 532 through orifice or port 536. Because of the cross sectional size differential between reducing valve 524 and master clutch piston 526, the pressure peak is minimized at the end of master clutch filling due to a small displacement of fluid when reducing valve 524 operation is switched from fill flow to metering flow.

Because the fluid flow to the master clutch through valve assembly 471 is so rapid, pressure reducing valve 524 may be caused to "overshoot". To avoid this problem, the control system of the present invention includes a "feedback" loop which prevents valve 524 from "overshooting". As illustrated in FIG. 10, ports 460 and 468 are fluidically joined to each other to create a "feedback" loop. By such construction, if valve 524 is moved downwardly under rapid clutch fill or other conditions, port 538 will open to port 460 and, ultimately, to exhaust through port 468 in a manner reducing the pressure acting to downwardly urge valve 524. This "feedback" connection between ports 460 and 468 prevents pressure rising in chamber 446 before the filling of the master clutch 16 is complete.

As seen in FIG. 14, displacement of valve 524, against the action of spring 531 also results in the blockage of port 460 and prevents "feedback" to port 468. As a result of valve 524 shifting in the manner described, piston chamber 446 is disconnected from exhaust.

With a metered flow through orifice 540 into chamber 462 and with port 460 and chambers 446 and 462 blocked from exhaust, master clutch pressure rises at a modulated rate to about 150 p.s.i. (This pressure level is maintained in the low range speeds 1 through 6). Fluid pressure also rises in chamber 446 as a result of back pressure fluid from master clutch 16 passing thereinto.

Figure 15:
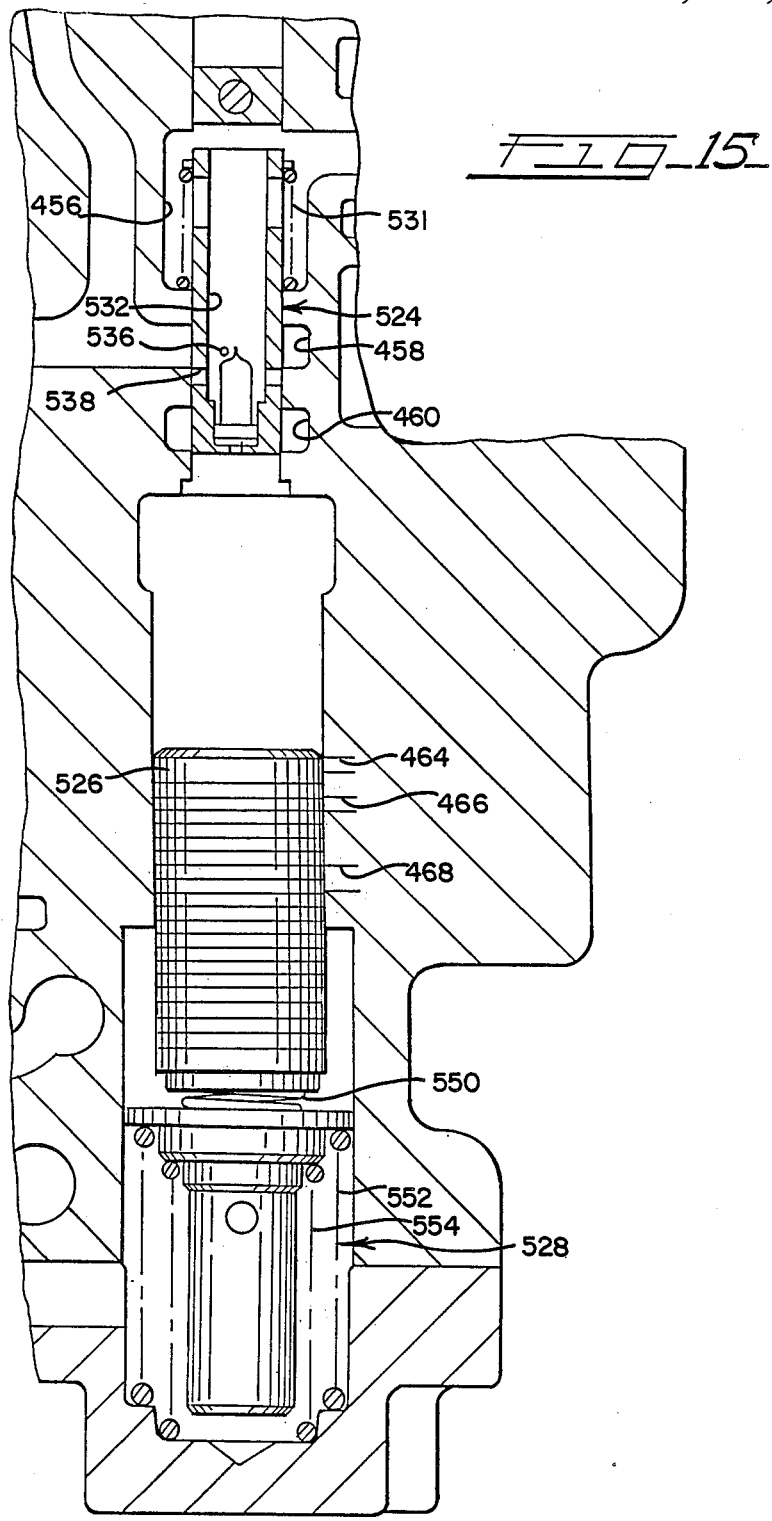
FIG. 15 is a view similar to FIG. 14 illustrating a shifted position of a piston forming part of the automatic master clutch pressure modulation valve assembly.
Figure 16:
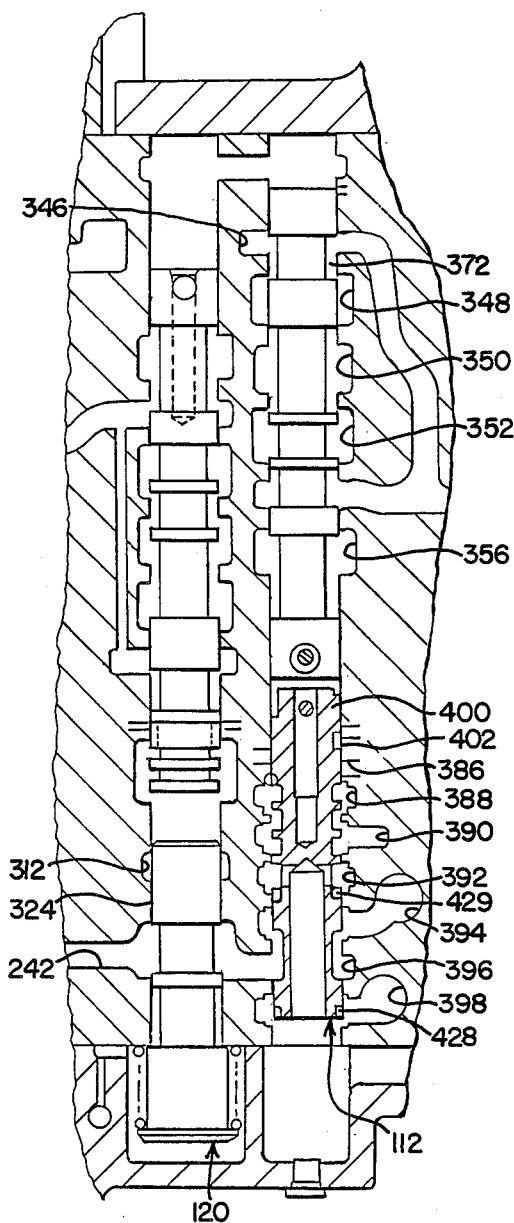
FIG. 16 is another partial sectional view illustrating that group of hydraulic control valves, illustrated in FIG. 7, in other operable positions.

As illustrated in FIG. 15, the fluid pressure rise in chamber 446 acts to move piston 526 against the action of spring mechanism 528 in a manner increasing the spring force against piston 526. The increase in spring force is directly related to pressure increase in chamber 456 which, in turn, increases master clutch operating pressure.

It will be appreciated that the master clutch pressure initially rises along a substantially straight line trace having a specific slope as the spring 550 compresses. Master clutch pressure rises along a second substantially straight line trace having a steeper slope after the piston moves against springs 552 and 554.

Displacement of piston 526 in chamber 446 will eventually uncover port 464. When piston 526 uncovers port 464, a fluid flow path is established between port 464 and port 344 of valve 110. Because range selector valve 110 has been moved into its "Lo" position (FIG. 13), port 344 is open to exhaust port 342. Thus, piston 526 will stop moving downward after uncovering port 464 and maintains a predetermined pressure (in the proposed embodiment 150 p.s.i. is preferred) in chamber 446 and, likewise, in port 568 leading to the master clutch inlet port 454.

Because of the displaced position of piston 526, port 468 is blocked. When port 468 is blocked by the piston 526, there is no fluid connection from port 460 to exhaust which would cause an instability due to unpredictable leakage rates.

Returning now to FIG. 13, with the odd/even valve 112 in its "ODD" position, port 382 is blocked to exhaust by land 402. If the tractor had been started in any position other than "NEUTRAL", the blockage of port 382 by land 402 would not have allowed the master clutch engagement valve 122 to shift into a position allowing pressurization of master clutch 16 until the transmission shift lever was shifted into a "NEUTRAL" position.

When valve 112 assumes an "ODD" position within bore 340, land 402 blocks port 384 from fluidically communicating with exhaust. By blocking port 384 from exhaust, the fluid passed from port 130 of FNR valve 106 into chamber 128 is allowed to create a high pressure level in the chamber 128 in a manner forcing valve 106 downwardly under relatively high pressure. As a result, if FNR valve 106 has not been fully moved into its forward position by the mechanical connection to the transmission shift lever, the pressure created in chamber 128 will forcibly move valve 106 until it engages divider 127 in bore 126 and in a manner overcoming the opposing force of centering spring 204.

With the shift lever in its first forward gear position and the valve actuating mechanism positioning valve 112 into its "ODD" position, the even clutch assembly 34 is open to exhaust. To effect such ends, port 394 opening to clutch assembly 34 communicates with radial bore 432 and axial bore 430 which opens to exhaust at the far end of valve spool 400.

In summary, with the transmission in a first "FORWARD" gear position, odd clutch assembly 32 is pressurized through port 398. The ½ clutch assembly 48 is open to port 266 of speed selector valve 108 and is actuated. Clutch assembly 48 was engaged in the "NEUTRAL" position and remains engaged in the first "FORWARD" position. Moreover, a high supply pressure from pump 102 flows from port 348 to engage the low range clutch assembly 74. Furthermore, master clutch 16 has been modulated to 150 p.s.i. pressure.

A typical upshift from a first forward speed ratio to a second forward speed ratio involves shifting odd/even valve 112 from an "ODD" position to an "EVEN" position. As valve 112 moves from one position to the other, valve spool 400 passes through an intermediate position which disconnects port 242 from port 388 and connects it to exhaust. Movement of valve spool 400 from an odd position to an even position also connects chamber 446, through check valve 391, to exhaust.

Normally, the odd/even valve 112 very quickly shifts through its intermediate position. As such, that no noticeable effect is caused on the pressure in port 390 or in the master clutch 16.

If valve spool 400 moves slowly, or valve spool 400 moves through the intermediate position several times in succession, piston 526 will, nevertheless, have sufficient time to displace fluid from chamber 446. As will be understood, displacement of fluid from chamber 446 will cause a drop in master clutch pressure. The master clutch will be reengaged gradually after port 390 is fluidically rejoined to port 388.

If, however, odd/even valve 112 becomes stuck in an intermediate position for a longer period of time, fluid in pressure port 396 leading to odd and even ports 398 and 394, respectively, and in accumulator 238 will drain through orifice 387 (FIG. 2). The operative effect of draining port 396 and accumulator 238 of pressure through orifice 387, is that odd/even valve 112 will engage neither the odd nor even drive gear assemblies 28, 30, respectively. In effect, odd/even valve 112, under such conditions, provides a "neutral" range for odd and even clutch assemblies 32, 34, respectively. As such, the various speed and range clutches disposed throughout the transmission are protected from failure due to inadvertent or partial engagement when valve 112 does not complete a shift because no power is being delivered thereto through odd/even drive gear assemblies 28, 30, respectively.

During a normal switching function from "ODD" to "EVEN", odd/even valve 112 connects odd port 398 to exhaust and even port 394 to supply pressure. During the transition, valve spool 400 connects the odd port 398 through peripheral slot 428 to exhaust. During its movement to an EVEN (2nd gear) position, the even port 394 is disconnected from full exhaust (slot 429 remains open to exhaust) and connects it to supply pressure received from port 242. Simultaneously therewith, the odd port 398 is disconnected from receiving supply pressure from port 242 and is open to full exhaust.

As soon as port 242 is connected to even inlet port 394, accumulator 238 discharges fluid to the clutch assembly 34 of the even drive gear assembly. This causes rapid filling of the clutch assembly 34. After clutch assembly 34 is filled, the clutch pressure in port 394 rises to the charge pressure of the accumulator 238 which is then recharged at a given rate to full pressure through orifice 387.

As will be appreciated, the same sequence as described above is reversed in an even to odd downshift.

As the transmission shift lever is sequenced from first through sixth gears, the three selector valves 108, 110 and 112 are positioned by the valve actuating mechanism. Between first and sixth gears, speed selector valve 108 moves, under the influence of the valve actuating mechanism, from its 1st position to its "3rd" position and then to its "5th" position. The valve actuating mechanism, in first through sixth gears, maintains range selector valve 110 in its "Lo" position. Moreover, the valve actuating mechanism alternates the odd/even valve 112 with each gear shift. Master clutch valve 114, range blocker valve 116, odd/even blocker valve 118, flow sensor valve 120, and master clutch valve engagement valve 122 maintain their static position during these shifts.

In a typical double clutch shift (even to odd upshift or odd to even downshift), odd/even valve 112 performs the same functions and is sequenced as in a single clutch shift described above. Simultaneously, speed selector valve 108 is moved one position up or down depending upon the desires of the operator.

In a double clutch shift, the oncoming forward gear assembly is disconnected from exhaust. Simultaneously therewith, supply pressure is disconnected from that forward gear assembly which is being disconnected or slipped off. An instant later, an exhaust port of speed selector valve 108 is fluidically connected to that forward gear assembly being slipped off and supply pressure is connected to the oncoming forward gear assembly in a manner assuring a smooth, quality shift between gear ratios.

In its final position, speed selector valve 108 assures that the oncoming forward gear assembly is fully connected to port 268 in a manner allowing a rapid discharge of accumulator 125. The provision of accumulator 125 assures quick filling and subsequent engagement of the clutch assembly associated with the oncoming forward gear assembly.

Because the powershift clutches are not capable of prolonged slippage or transfer of high torque, there normally would be concern if valve 108 is prevented from completely shifting from one position to another. A failure of valve 108 to completely shift from one operable position to another could simultaneously present supply pressure to two different gear assemblies simultaneously in a manner damaging the transmission. Operation of valve 108, however, is interrelated with valves 110 and 112. If any one of the three interrelated valves 108, 110 or 112 becomes stuck, odd/even valve 112 assumes a neutral position discussed above so as to prevent power flowing to the transmission output shaft through the various speed and range clutches disposed throughout the transmission in a manner protecting the powershift clutches against damage.

As the shift lever is sequenced from seventh through twelfth gears, the three selector valves 108, 110 and 112 are positioned by the valve actuating mechanism. Between seventh and twelfth gears, speed selector valve 108 moves, under the influence of the valve actuating mechanism, from its "1st" to its "3rd" and then to its "5th" position. The valve actuating mechanism, in seventh through twelfth gears, maintains range selector valve 110 in its "MID" position. Moreover, the valve actuating mechanism alternates the odd/even valve 112 with each gear shift. Range blocker valve 116, odd/even blocker valve 118 flow sensor valve 120, and master clutch engagement valve 112 are all static during these shifts.

Figure 17:
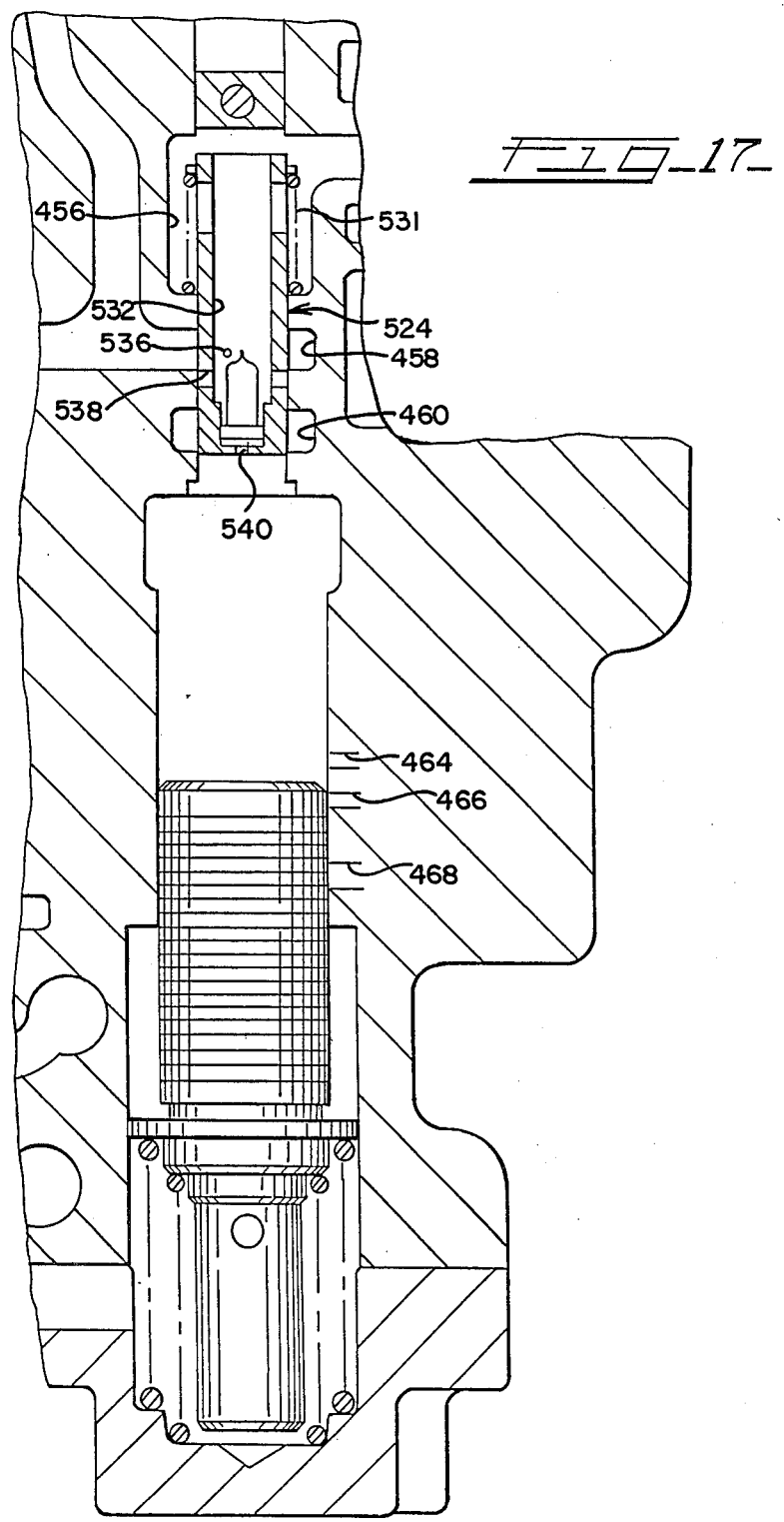
FIG. 17 is a partial sectional view similar to FIG. 15 illustrating another shifted position of the automatic master clutch pressure modulation valve assembly piston.

The automatic clutch pressure modulation assembly 471 of master clutch control valve 114 is not static, however, during the seventh through twelfth gear shift sequence. A gear shift from sixth to seventh gear involves shifting all three selector valves 108, 110 and 112. In seventh and eight gears (½ forward gear assembly engaged), supply pressure from outlet port 266 of speed selector valve 108 is directed to port 466 of master clutch valve 114. From port 466 supply pressure fluid is passed into chamber 446 thereby increasing the pressure therein. The additional pressure in chamber 446 causes further linear displacement of piston 526 (FIG. 17) and further causes spring mechanism 528 to react against the pressure rise thereby increasing the master clutch operating pressure. This increase in master clutch operating pressure is maintained in eighth gear. In ninth through twelfth gears (¾ and 5/6 gear assemblies 42 and 44, respectively engaged), port 266 of speed selector valve 108 is open to exhaust. As such, the additional fluid pressure to chamber 446 is abated and the master clutch operating pressure returns to about 180 p.s.i.

As the transmission shift lever is sequenced from thirteenth through eighteenth gears, the three selector valves 108, 110 and 112 are positioned within the valve body by the valve actuating mechanism. Between thirteenth and eighteenth gears, speed selector valve 108 moves, under the influence of the valve actuating mechanism, from its "1st" to its "3rd" and then to its "5th" position. The valve actuating mechanism, in twelfth through eighteenth gears, maintains range selector valve 116 in its "HIGH" position. Moreover, the valve actuating mechanism alternates the odd/even valve 112 with each gear shift. Range blocker valve 116, and master clutch engagement valve 122 maintain their static position during these shifts.

The automatic clutch pressure modulation assembly 471 of master clutch control valve 114 is not static during the thirteenth through eighteenth gear shift sequence. During the thirteenth through eighteenth gear shift sequence, operating pressure to the master clutch 16 is automatically modulated by the automatic pressure modulation assembly 471 in a manner substantially similar to the manner it was automatically modulated in the above described seventh through twelfth shift sequence.

Figure 18:
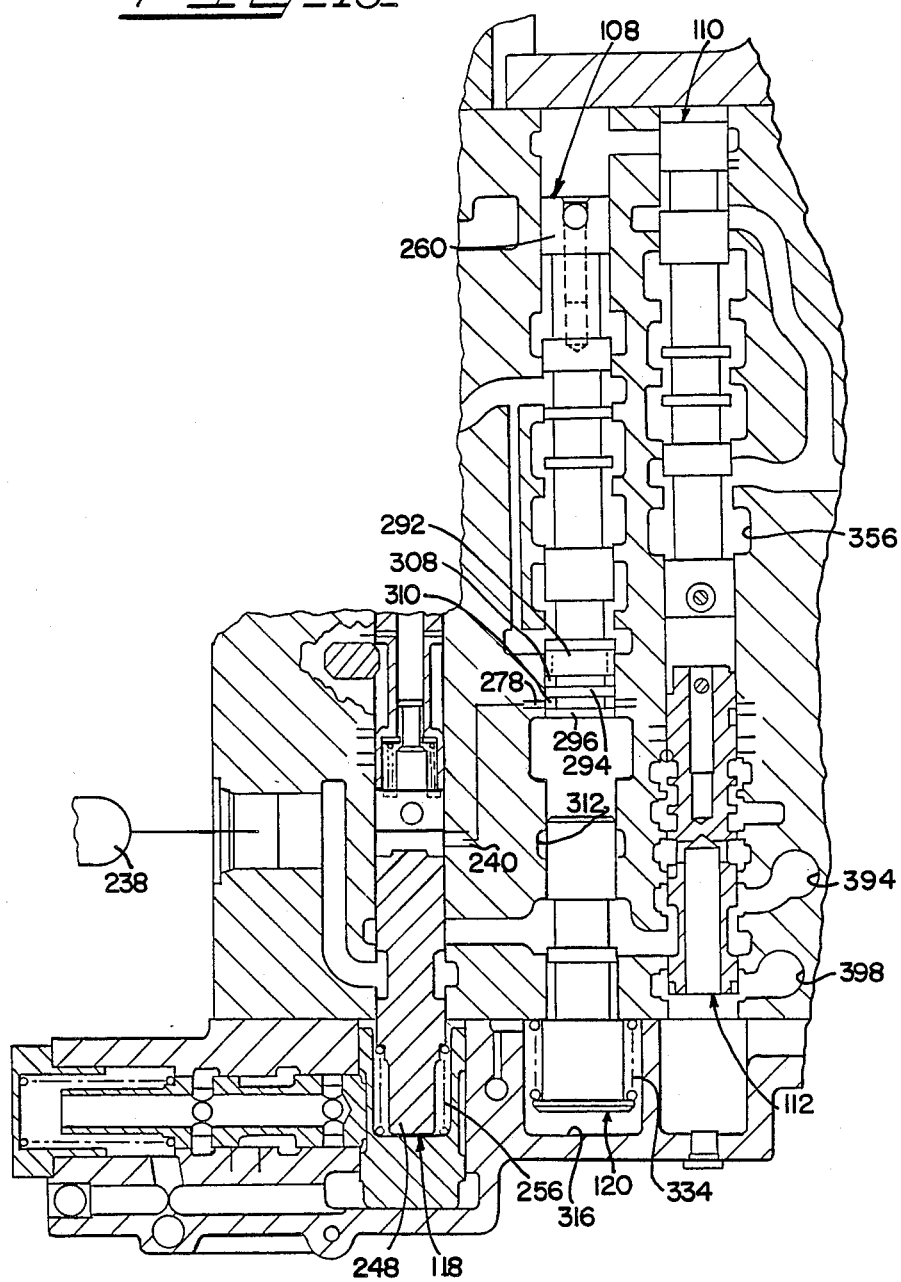
FIG. 18 is a partial sectional view illustrating one valve, in the group of hydraulic control valves illustrated in FIG. 3, in a shifted position.

Speed selector valve 108 performs an additional function in the higher speed ratios of the transmission. As seen in FIG. 18, port 278 of valve 108 is fluidically connected to port 356 of valve 110 and to port 240 of odd/even blocker valve 118 in the higher speed ratios of the transmission. In the higher speed ratios of the transmission, range selector valve 110 directs supply pressure to port 356 to actuate the high range clutch assembly 68. Moreover, in the higher speed ratios (12 through 18), valve spool 260 of speed selector valve 108 is positioned to allow fluid from port 356 of valve 110 to pass across grooves 308 and 310 and be presented to port 240 of odd/even blocker valve 118 in a manner displacing valve spool 248 against the action of spring 256 and into the position shown in FIG. 18.

With odd/even blocker valve 118 so disposed, fluid flow from accumulator 238 is blocked from flow sensor valve 120 and odd/even valve 112. If any shift is made with the valve 118 in this shifted position, engagement of either clutch assembly 32 or 34 associated with the odd drive gear assembly 28 or even drive gear assembly 30, respectively, will be delayed. Engagement of either drive gear assembly 28 or 30 will be delayed since clutch fill operation for clutch assemblies 32, 34 is dependent on fluid flow through orifice 387 (FIG. 2).

Operation of the flow sensor valve 120 is interactive with the odd/even blocker valve 118. When the odd/even blocker valve 118 is shifted into the position shown in FIG. 18, it blocks fluid flow from accumulator 238 to odd and even outlet ports 398 and 394, respectively, of odd/even valve 112. Fluid flow to ports 398 and 394 is limited to fluid flow through orifice 387. This orificed fluid flow likewise causes a pressure drop in chamber 316 of flow sensor valve 120.

A sufficient reduction in fluid pressure in chamber 316 allows spring 334 to shift valve spool 318 sufficiently to open port 312 to exhaust. When port 312 is open to exhaust, pressure in chambers 446 and 462 of master clutch valve 114 and port 586 (through check valve 391) of master clutch engagement valve 122 is reduced thereby reducing master clutch operating pressure during the fifteenth to sixteenth, sixteenth to seventeenth, and seventeenth to eighteenth gear shifts. Only after the odd/even operating pressure rises again sufficiently to shift flow sensor valve 120 against the action of spring 334 will the master clutch operating pressure rise to handle the increased clutch load due to the larger change in ground speed of the tractor.

The master clutch pressure engagement profile during gear shifts between twelfth and eighteenth speeds is faster than during a shift from Neutral because additional fluid flow is provided to chamber 462 from port 356 through orifice 357 and check valve 359. The purpose of this automatic pressure modulation during the fifthteenth to eighteenth shift sequence is to have the master clutch 16 absorb the shift load.

In addition to those shifts described above, the control system of the present invention also allows accomplishment of multiple step shifts. During a multiple step shift, odd/even valve 112 moves several times through its neutral position. Every time odd/even valve 112 moves through its neutral position, it exhausts some of the fluid in the accumulator 238 and some of the fluid in piston chamber 446.

Exhausting accumulator 238 and piston chamber 446 produces two effects. If accumulator 238 losses sufficient fluid, it will not have the capability to fill the odd or even clutch assembly 32, 34, respectively, whichever has been selected for operation by the operator. Thus, the actuating fluid pressure supplied to valve 112 will be reduced in a manner causing the flow sensor valve 120 to shift into position exhausting master clutch control piston chamber 446. By exhausting the master clutch control piston chamber 446, the master clutch operating pressure will be modulated after the odd or even clutch assembly 32, 34, respectively is filled. In such a manner, the powershift clutches 32 and 34 are protected against damage.

Moreover, exhausting a portion or all of the pressure fluid from master clutch control piston chamber 446 will cause piston 526 to modulate the master clutch control pressure from whatever level it has fallen to after the final gear selection has been made.

The control system further contemplates logic for preventing damage to the powershift clutches when a shift is made from a forward gear to neutral. As noted above, in a neutral position, reverse clutch assembly 46 and one of the forward gear clutch assemblies 48, 50 or 52 are engaged to lock the speed transmission assembly 12. When the shift lever is quickly moved from a forward speed (i.e., first) to a neutral position, the odd clutch assembly 32 must be rapidly exhausted before the reverse clutch assembly 46 engages. Otherwise, either or both reverse clutch assembly 46 and odd clutch assembly 32 may be damaged. To prevent damage to either clutch assembly 32 or 46, a check valve 389 is incorporated in the control system of the present invention. Check valve 389 allows accumulator 238 to quickly discharge pressurized fluid from port 242 (rather than through orifice 387 only), through port 388 to exhaust. Simultaneously therewith, the reverse clutch assembly 46 fills slowly through orifices 294 and 296 in the FNR valve 106.

Figure 19:
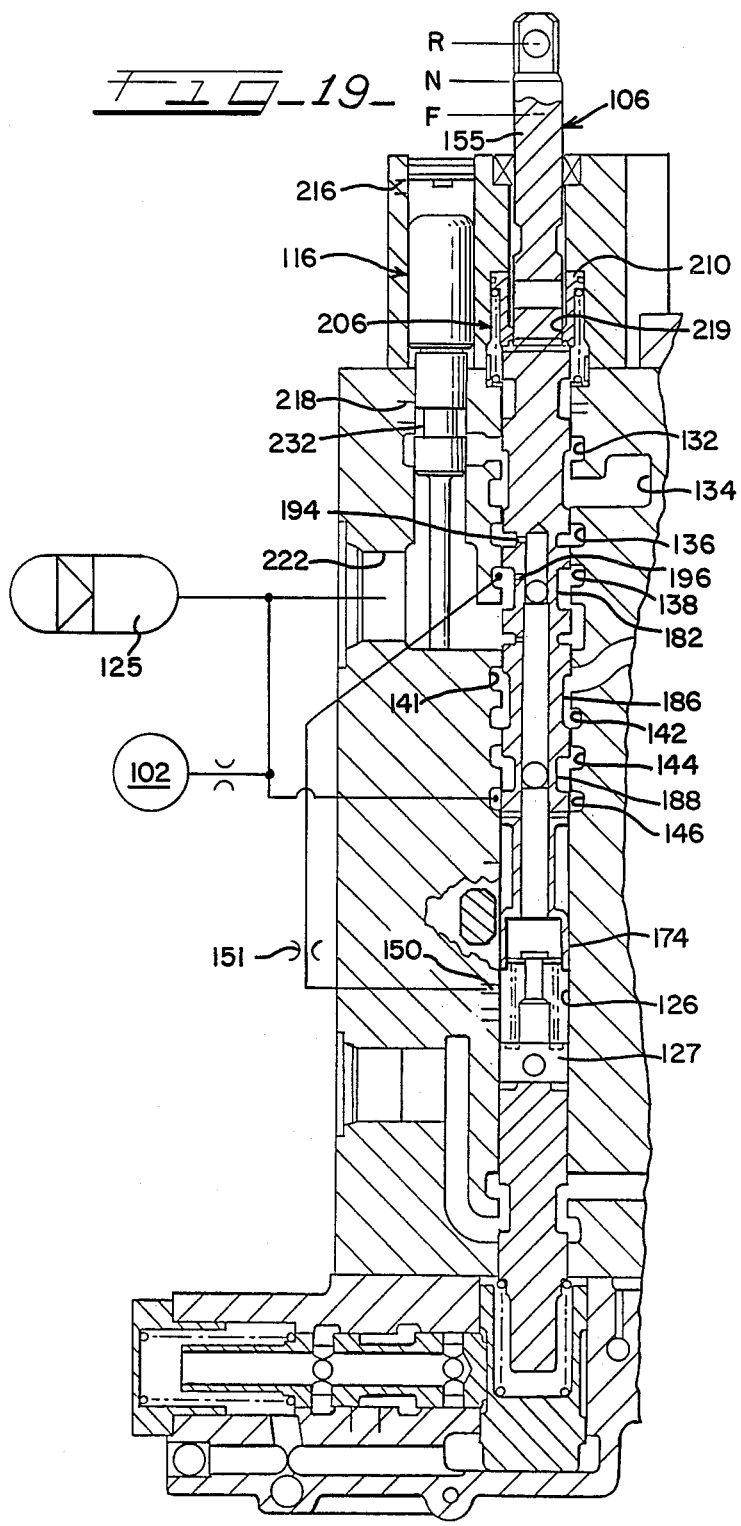
FIG. 19 is a partial sectional view illustrating a hydraulic control valve, illustrated in FIGS. 3 and 12, in another shifted position.

When the operator desires to condition the tractor for reverse movement, the transmission shift lever is moved toward the reverse gear range. Because FNR valve 106 is mechanically interconnected with the shift lever, movement of the shift lever causes linear displacement of FNR valve 106 from either its "N" or "F" positions to its "R" position as illustrated in FIG. 19.

When FNR valve 106 is linearly moved toward its "R" position, sealing land 219 on sleeve 210 coacts with stem section 155 to disconnect chamber 128 from exhaust. At the other end of valve 106, land 174 uncovers port 150. Opening of port 150 allows fluid flow across orifice 151 to enter axial bore 126 between valve 106 and separator 127. It should be noted, however, that fluid pressure cannot build-up between valve 106 and separator 127 because port 150 is open to exhaust through port 384 of odd/even valve 112. Thus, FNR valve 106, and the transmission shift lever connected thereto, would return to a neutral position under the influence of centering spring assembly 206 if the transmission shift lever is released by the operator.

With valve 106 shifted into a reverse or "R" position, port 141 is connected to exhaust port 142 across groove 186. Moreover, port 138, opening to the reverse clutch assembly 46, receives supply pressure from pump 102 across annular groove 182 rather than orifices 194, 196. Groove 182, will of course, permit relatively high flow rates to the reverse clutch assembly 46.

Shifting of valve 106 into its "R" position furthermore disconnects range selector valve 110 from receiving supply pressure from pump 102. As seen in FIG. 19, in its "R" position, valve 106 disconnects port 144 from exhaust and connects it to port 146 across groove 188. As such, supply pressure from pump 102 is presented to port 144. From port 144, pressurized fluid flows to port 388 of odd/even valve 112. From port 388, odd/even valve 112 allows supply pressure to pass to port 386. From port 386, a pressure signal passes to port 216 of range blocker valve 116 in a manner shifting valve 116 and, thereby, disconnecting port 132 of valve 106 from pressure inlet port 222. The shifted condition of valve spool 212 of valve 116 connects port 132 to exhaust port 218 across groove 232. Simultaneously therewith, port 134 of FNR valve 106 is disconnected from exhaust port 136 and is connected to port 132. There is little or no pressure in port 132, however, because it is blocked from receiving pressure by land 228 of valve 116.

When the transmission shift lever is moved to its "R1" position, the same sequence occurs as when the shift lever is moved to its first forward gear range accept that reverse clutch assembly 46 remains pressurized. The ½ forward gear assembly 40, although fluidically connected by speed selector valve 108 to port 268, remains open to exhaust. As mentioned, port 268 of speed selector valve 108 is exhausted by the FNR valve 106 when "REVERSE" gear is selected by the operator.

Control system 100 further includes means for limiting the range of reverse transmission speeds. As illustrated in FIG. 4, a chamfered pin 640 is slidably arranged in valve body 104 in the linear path of movement of valve spool 124 of FNR valve 106. Land 174 on FNR valve 106 is provided with a camming surface 642. When valve 106 is linear displaced towards its "REVERSE" position (FIG. 19), camming surface 642 acts to linearly displace pin 640. The displacement of pin 640 acts to prevent the transmission from shifting beyond a predetermined "REVERSE" range.

To operate the tractor in a forward creeper mode, the operator slides a lever in the shift console (with the transmission shift lever in neutral) which sends an electrical control signal to the ON/OFF creep solonoid 614 to regulate operation of creeper valve 123. During normal tractor operation, creeper valve 123 is inactive and allows fluid flow to normally pass to the odd and even drive gear assemblies 28 and 30, respectively.

An apparatus suitable to operate the tractor transmission in a creeper mode is disclosed in U.S. patent application Ser. No. 162,182, filed Feb. 26, 1988. The complete teachings of that application are also incorporated herein by reference.

When an electrical control signal (indicative of creep speed operation) is received by solonoid 614 a signal pressure is sent to port 604 of creeper valve 123. The signal pressure received at port 604 acts against the force of spring 634 and displaces spool 600 into the position illustrated in FIG. 20.

With creeper valve 123 shifted into the position illustrated in FIG. 20, valve spool 600: blocks fluid flow to the odd and even drive gear assemblies 28 and 32; exhausts accumulator 238; and exhausts whichever of the odd/even clutch assemblies which are engaged across groove 627 through radial port 630 and into axial bore 628. Simultaneously, supply pressure from port 390 of the odd/even valve 112 is directed to port 608. From port 608 supply pressure crosses groove 629 and enters port 610. From port 610 supply pressure 629 flows to and activates the creeper clutch assembly 56. Thereafter, speed selector valve 108 and range selector valve 110 are positioned to select the various clutch combinations for the different speeds.

Supply pressure from port 610 also acts as an input pressure to port 337 of valve arrangement 335. The input pressure to port 337 shifts the valve assembly 335 and directs pressure to chamber 316 of flow sensor valve 120. Thus, flow sensor valve 120 functions as described above.

When the clutch pedal in the tractor is operated from the disengaged position "D" to the engaged position "E", master clutch operational pressure is modulated by the manual clutch pressure modulation assembly 469 of master clutch control valve 114. Because master clutch stem 470 is connected to the clutch pedal, as the clutch pedal is allowed to move toward its engaged position, the master clutch stem 470 is likewise moved toward its engaged position (FIG. 9). Positioner springs (not shown) associated with the clutch pedal, operate to hold the master clutch stem 470 in its engaged position as long as the clutch pedal and master clutch stem 470 are interconnected with each other. If, for any reason, the clutch pedal and master clutch stem 470 become disconnected from each other, the master clutch stem 470 is automatically returned to its disengaged position "D" and master clutch operating pressure is dropped to a sufficient level to prevent further tractor movement.

As the master clutch stem 470 moves from its disengaged to its engaged position, it transmits a force through springs 523 and 525 to the clutch control valve spool 472. This force is sufficient to linearly displace valve spool 472. Displacement of valve spool 472 moves land 486 away from master clutch inlet port 454 in a manner allowing operating fluid to flow from port 566 of master clutch engagement valve 122 to the master clutch inlet port 454. The supply pressure fluid supplied to inlet port 454 also flows across groove 488 into radial port 506, across axial bore 502 and is exhausted to the end of spool valve 472. As the valve spool 472 is moving into its full engaged position "E", operating fluid entering axial bore 502 is also exhausted through port 504 to chamber 444 which is open to exhaust. By such construction, operating fluid is being supplied to the master clutch 16 and to exhaust at the same time, thus limiting the operating pressure of the master clutch as a function of the spring force acting against valve spool 472.

An equilibrium between the pressure force acting against valve spool 472 is established by metering operating fluid from the master clutch inlet port 454 to the master clutch outlet port 452 across slots 505 and 507 provided on the spool valve 472. When springs 523, 525 and 527 are sufficiently depressed, the head portion 476 of valve stem 470 will contact valve spool 472 and push the spool 472 against separator 442. When spool valve 472 is pressed against separator 442 (as illustrated in FIG. 20), port 504 is blocked from exhausting operating fluid to exhaust and, thereby, allowing full pressure to enter into master clutch outlet port 452 across groove 488.

From the foregoing, it will be observed that numerous modifications or variations which can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A control system for a transmission which is shiftable from a neutral condition into either forward or reverse conditions as selected by a positionable shift lever, said transmission having speed and range transmission assemblies which are selectively coupled by a fluid actuated master clutch, said speed transmission assembly comprising interconnected input and output sections, said input section including alternatively operated drive clutch assemblies for developing at least two different input speed ratios, said output section including at least three clutch operated forward drive gears and a clutch operated reverse drive gear, said range transmission assembly including at least three different clutch operated range assemblies, said control system comprising:
    a valve body connected to a source of pressurized fluid;
    first operative means arranged in combination with said valve body for directing pressurized fluid to the alternatively operated drive clutch assemblies of the speed transmission assembly input section;
    second operative means arranged in combination with said valve body for selectively directing pressurized fluid to one of said three clutch operated forward drive gears of the speed transmission assembly output section;
    third operative means arranged in combination with said valve body for selectively directing pressurized fluid to one of said clutch operated range assemblies of the range transmission assembly; and
    fourth operative means arranged in combination within the valve body for directing pressurized fluid to the first, second and third operative means and to the clutch operated reverse drive gear as a function of the position of the shift lever.

2. A transmission control system according to claim 1 further including means for blocking a directed flow of pressurized fluid to the clutch operated range assemblies whenever the master clutch is disengaged.

3. A transmission control system according to claim 2 wherein said blocking means includes a valve means whose linear position in said valve body controls fluid flow therepast, the linear position of said valve means being determined as a function of pressure differentials acting against the valve means.

4. A transmission control system according to claim 3 wherein said valve means blocks a directed flow of regulated pressure to the clutch operated range assemblies when the transmission is in a neutral condition.

5. A transmission control system according to claim 1 wherein said transmission is positively conditioned in a neutral condition by said first and fourth operative means operating in combination to direct pressurized fluid to at least two clutch operated drive gears in the output section of the speed transmission to block incidental torque flow through the transmission.

6. A transmission control system according to claim 1 wherein said third operative means exhausts pressurized fluid directed thereto if a change in speed ratios not completed.

7. A transmission control system according to claim 1 further including valve means which prevents initial master clutch engagement if the transmission is conditioned in other than a neutral condition.

8. A transmission control system according to claim 1 wherein said first, second and third operative means are connected for interrelated movement in said valve body.

9. A control system for a transmission having a speed transmission assembly including an input shaft and a plurality of clutch operated means for effecting a plurality of different forward output speeds and at least one reverse output speed, a range transmission assembly including a transmission output shaft and a plurality of clutch operated means, each clutch operated means of said range transmission assembly being capable of modifying the different output speeds of said speed transmission assembly, and a fluid pressure actuated master clutch assembly for selectively coupling said transmission assemblies, said control system comprising:
    a valve body connected to a hydraulic source of fluid pressure;
    operator controlled means arranged in said valve body for selectively directing fluid pressure to various clutch operated means in said speed and range transmission assemblies to condition the transmission into a forward, reverse, or neutral mode of operation; and
    means for modulating master clutch operation as a function of various transmission operating conditions.

10. A control system according to claim 9 wherein said operator controlled means includes control valve means positionally movable in said valve body between forward, reverse, and neutral positions in response to relatively low actuating forces being applied thereto and which is maintained in either forward or reverse positions under relatively large forces.

11. A control system according to claim 10 wherein said operator controlled means directs fluid pressure to at least two clutch operated means in said speed transmission assembly to block incidental torque flow through the transmission when in a neutral position.

12. A control system according to claim 11 wherein directed fluid pressure flow to clutch operated means in said range transmission assembly is reduced when the control valve means is positioned in neutral.

13. A control system according to claim 9 wherein said means for modulating master clutch operation includes valve means which delays master clutch actuation as a function of fluid pressures in said valve body.

14. A control system according to claim 9 wherein said operator controlled means includes valve means shiftable between two positions and across a neutral position for every forward output speed change, said shiftable valve being fluidically interconnected with said means for modulating master clutch operation.

15. A control system according to claim 10 wherein said control valve means is a spring centered valve normally biased toward said neutral position.

16. A control system according to claim 15 wherein the position of said control valve means is monitored by a switch assembly.

17. A control system according to claim 9 wherein said means for modulating master clutch operation includes a fluid pressure responsive valve fluidically interrelated with said operator controlled means for modulating fluid pressure to the master clutch in higher forward speeds.

18. A control system for a transmission including an operator controlled shift lever, a speed transmission assembly having a rotatable input shaft and a plurality of fluid pressure operated drive assemblies for conditioning the transmission into a creeper, a forward, or a reverse mode of operation as a function of shift lever position, a range transmission assembly including a transmission output shaft and a plurality of fluid pressure operated drive assemblies for conditioning the transmission to operate in various speed ranges as a function of shift lever position, and a master clutch for selectively coupling the speed and range transmission assemblies, said control system comprising:
a hydraulic valve body connected to a source of fluid pressure;
operator controlled means arranged in said valve body and operably connected to said shift lever for directing fluid pressure to select drive assemblies as a function of shift lever position, said operator controlled means including a fluid valve apparatus the position of which in said valve body controls the creeper mode of transmission operation; and
means for controlling master clutch operation as a function of various transmission operating conditions.

19. The control system according to claim 18 wherein said operator controlled means includes a control valve which is shiftable into forward, neutral and reverse positions.

20. The control system according to claim 19 wherein said control system further includes valve means responsive to fluid pressure differentials applied thereto and which disconnects said input shaft from said transmission output shaft when said control valve is in a neutral position.

21. The control system according to claim 18 wherein said valve apparatus includes electrically controlled solenoid means for directing fluid flow from said valve apparatus as a function of electrical signals directed to said solenoid means.

22. The control system according to claim 18 wherein said control system further includes means for modulating master clutch operation as a function of fluid pressures in said valve body.

23. A control valve for a fluid actuated master clutch of a transmission which is shiftable from a neutral condition to multiple step forward and reverse conditions, said transmission including a speed transmission assembly, a range transmission assembly, with said master clutch operably disposed therebetween for selectively coupling said speed and range transmission assemblies, said control valve comprising:
a valve body defining an inlet port to which fluid pressure is directed and an outlet port opening to said master clutch;
a manual master clutch pressure modulation assembly operably arranged in said valve body between said inlet port and said outlet port for regulating operation of said master clutch in response to manual operation of said assembly; and
an automatic master clutch pressure modulation assembly operably arranged in said valve body between said inlet port and said outlet port for automatically regulating operation of said master clutch in response to continuing operating conditions of the transmission.

24. A control valve according to claim 23 wherein said automatic master clutch pressure modulation assembly includes a valve which is responsive to fluid pressure differentials applied thereagainst and which modulates the pressure flowing to said outlet port anytime a shift is made from a neutral condition.

25. A control valve according to claim 23 wherein said automatic master clutch pressure modulation assembly includes valve means responsive to fluid pressure differentials applied against it and which modulates the pressure flowing to said outlet port any time a multi-step shift is made.

26. A control valve according to claim 23 wherein said automatic master clutch pressure modulation assembly includes a cylindrical valve arranged in combination with one or more springs, said valve means being arranged for endwise displacement in said valve body, said valve means defining axially spaced metering ports which are fluidically joined to each other, said metering ports causing the valve means to stay in one position during filling of the master clutch and then cause said valve means to move to a second position to meter flow to the master clutch.

27. A control valve according to claim 26 wherein said valve body further defines a piston chamber and an exhaust port leading from said chamber, wherein the second position of said valve means blocks said exhaust port thus providing a relatively low pressure on the master clutch during clutch filling and then providing a pressure modulation from the lowest possible initial pressure setting.

28. A control valve according to claim 27 wherein said automatic master clutch pressure modulation assembly further includes a resiliently biased piston arranged for endwise displacement within said piston chamber.

29. A control valve mechanism for a fluid actuated master clutch of a transmission which is shiftable from a neutral condition into multiple step forward and reverse conditions, said transmission including a speed transmission, a range transmission assembly, with master clutch operably disposed therebetween for selectively coupling said speed and range transmission assemblies, said control valve mechanism comprising:
a valve body defining a fluid passageway for directing fluid to said master clutch;
a valve assembly operably arranged in said fluid passageway and having a manual mode of operation and an automatic mode of operation, said valve assembly regulating operation of said master clutch in response to manual operation of said valve assembly during its manual mode of operation and automatically regulating operation of the master clutch in response to continuing operating conditions of the transmission during its automatic mode of operation.

30. A control valve mechanism according to claim 29 wherein said valve assembly includes a first spring biased valve arranged in said passageway for regulating fluid flow to said master clutch as a function of manual operation of said valve, a second spring biased valve which responds to fluid pressure differentials applied thereagainst and which automatically modulates the fluid flow to said master clutch anytime a shift is made from a neutral condition.

31. A control valve mechanism according to claim 29 wherein said valve assembly includes a first spring biased valve arranged in said passageway for regulating fluid flow to said master clutch as a function of manual operation of said valve, a second spring biased valve which responds to fluid pressure differentials applied thereagainst and which automatically modulates the fluid flow to said master clutch anytime a multi-step shift is made.

32. A control valve mechanism according to claim 29 further including an apparatus operably arranged in said valve body in series with said valve assembly for preventing master clutch engagement under certain operating conditions of the transmission.

33. A control valve mechanism according to claim 29 wherein said valve assembly includes a pressure reducing valve and a spring actuated piston arranged in combination in said valve body, said pressure reducing valve being shiftable between a master clutch fill flow position and a master clutch metering flow piston, said reducing valve having a relatively small cross sectional area compared with the cross sectional area of said piston thus minimizing a pressure peak upon completion of filling of the master clutch due to a relatively small fluid displacement when the pressure reducing valve shifts from its fill flow position to its metering position.

34. A control valve for a fluid actuated master clutch of a transmission shiftable from a neutral condition and operable in low, medium and high ranges with each range having a plurality of progressively different speed ratios, said master clutch being operably disposed between speed and range transmission assemblies comprising said transmission, said control valve assembly comprising:
 a valve body having an inlet port to which fluid pressure is directed and an outlet port opening to said master clutch;
 a first valve assembly operably disposed between said inlet and outlet ports for modulating fluid pressue to said master clutch in response to manual manipulation of said first valve assembly; and
 a second valve assembly operably disposed between said inlet and outlet ports for automatically modulating fluid pressure to said master clutch during transmission operation including disengagement of the master clutch between shifts in higher speed ratios and subsequent modulated rengagement of the master clutch.

35. A control valve according to claim 34 wherein said first valve assembly is normally biased into a position to effect disengagement of the master clutch.

36. A control valve according to claim 34 wherein said second valve assembly includes a reducing valve and a master clutch piston arranged in an axially aligned relationship relative to one another in said valve body.

37. A control valve according to claim 36 wherein said reducing valve includes a plurality of axially spaced ports which are fluidically joined to each other, said reducing valve being resiliently biased into a first position during master clutch filling to establish an initial pressure setting and then moved to a second position for metering fluid flow to said master clutch.

38. A control valve according to claim 37 wherein said reducing valve moves between positions in response to fluid pressure differentials acting against the reducing valve.

39. A control valve according to claim 37 wherein said valve body further defines a piston chamber in which said master clutch piston is slidably arranged, said valve body further defining an exhaust port extending from said piston chamber, said exhaust port being blocked by said reducing valve when said reducing valve is positioned in its second position thus providing low pressure actuating force during master clutch filling and then providing pressure modulation from the initial pressure setting.

40. A control valve according to claim 34 further including a master clutch engagement valve means which blocks fluid flow to said master clutch when said inlet port is pressurized and the transmission is conditioned for forward or reverse operation.

41. A control valve according to claim 40 wherein said master clutch engagement valve means is resiliently biased into an initial position.

* * * * *